US009449498B2

(12) United States Patent
Dina et al.

(10) Patent No.: US 9,449,498 B2
(45) Date of Patent: Sep. 20, 2016

(54) WIRELESS COMMUNICATION NETWORK POWER OPTIMIZATION FOR CONTROL OF INDUSTRIAL EQUIPMENT IN HARSH ENVIRONMENTS

(71) Applicant: Illinois Tool Works Inc., Glenview, IL (US)

(72) Inventors: Daniel Dina, North Barrington, IL (US); Kathy Lee Downie, Spring Grove, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 214 days.

(21) Appl. No.: 13/795,875

(22) Filed: Mar. 12, 2013

(65) Prior Publication Data

US 2014/0049382 A1 Feb. 20, 2014

Related U.S. Application Data

(60) Provisional application No. 61/684,546, filed on Aug. 17, 2012.

(51) Int. Cl.
*G05B 11/01* (2006.01)
*G08C 17/02* (2006.01)
(Continued)

(52) U.S. Cl.
CPC ............... *G08C 17/02* (2013.01); *B23K 9/095* (2013.01); *B23K 9/1087* (2013.01); *B23K 9/322* (2013.01); *H04W 4/008* (2013.01); *H04W 52/02* (2013.01); *H04W 56/001* (2013.01)

(58) Field of Classification Search
CPC ...... B23K 9/00; B23K 9/095; B23K 9/0953; B23K 9/0956; B23K 9/10; B23K 9/1006; B23K 9/1012; B23K 9/1043; B23K 9/1056; B23K 9/1062; B23K 9/1081; B23K 9/1087; B23K 9/1276; B23K 9/32; B23K 9/321; B23K 9/322; B23K 31/00; B23K 31/006; B23K 37/00; B23K 37/006; H04W 4/005; H04W 4/006; H04W 4/008; H04W 4/20; H04W 8/00; H04W 8/22; H04W 8/24; H04W 8/245; H04W 28/00; H04W 28/02; H04W 28/0231; H04W 28/0236; H04W 28/06; H04W 28/10; H04W 52/00; H04W 52/02–52/0219; H04W 52/0235; H04W 52/0248; H04W 52/0258; H04W 52/24–52/267; H04W 56/00; H04W 56/001–56/003; H04W 56/004; H04W 56/0045; H04W 56/0055; H04W 84/00; H04W 84/18; H04W 84/20; G08C 17/02
See application file for complete search history.

(56) References Cited

U.S. PATENT DOCUMENTS 4,216,367 A 8/1980 Risberg
5,499,178 A * 3/1996 Mohan ............................ 363/39

(Continued)

FOREIGN PATENT DOCUMENTS

CN 2353480 12/1999
CN 2384730 6/2000

(Continued)

OTHER PUBLICATIONS

International Search Report for PCT application No. PCT/US2013/055002 dated Mar. 5, 2014, 14 pgs.

(Continued)

*Primary Examiner* — Ryan Sherwin
(74) *Attorney, Agent, or Firm* — Fletcher Yoder P.C.

(57) ABSTRACT

In certain embodiments, a system includes a master node device. The master node device includes communication circuitry configured to facilitate communication with a welding power supply unit via a long-range communication link, and to facilitate wireless communication with one or more welding-related devices via a short-range wireless communication network. The master node device also includes control circuitry configured to manage power consumption of on-board batteries of the master node device and the one or more welding-related devices.

21 Claims, 8 Drawing Sheets

(51) Int. Cl.
*H04W 4/00* (2009.01)
*B23K 9/32* (2006.01)
*H04W 52/02* (2009.01)
*B23K 9/095* (2006.01)
*H04W 56/00* (2009.01)
*B23K 9/10* (2006.01)

(56) References Cited

U.S. PATENT DOCUMENTS

| | | | |
|---|---|---|---|
| 5,808,885 A | | 9/1998 | Dew |
| 6,016,528 A * | | 1/2000 | Jaramillo et al. ............ 710/243 |
| 6,087,622 A | | 7/2000 | Summers |
| 6,417,995 B1 | | 7/2002 | Wu et al. |
| 6,583,386 B1 | | 6/2003 | Ivkovich |
| 6,624,388 B1 | | 9/2003 | Blankenship |
| 6,636,776 B1 | | 10/2003 | Barton |
| 6,734,393 B1 | | 5/2004 | Friedl et al. |
| 6,867,386 B1 | | 3/2005 | Niwa |
| 6,909,066 B2 | | 6/2005 | Zheng |
| 7,038,167 B2 | | 5/2006 | Hayes |
| 7,045,742 B2 | | 5/2006 | Feichtinger et al. |
| 7,245,875 B2 | | 7/2007 | Clark et al. |
| 7,307,241 B2 | | 12/2007 | Hayes |
| 7,342,210 B2 | | 3/2008 | Fergason |
| 7,363,137 B2 | | 4/2008 | Brant et al. |
| 7,375,304 B2 | | 5/2008 | Kainec et al. |
| 7,574,172 B2 | | 8/2009 | Clark et al. |
| 7,643,890 B1 | | 1/2010 | Hillen |
| 7,810,937 B2 | | 10/2010 | Garbergs et al. |
| 7,873,495 B2 | | 1/2011 | Lindell |
| 7,979,162 B2 | | 7/2011 | Niemela et al. |
| 7,996,276 B2 | | 8/2011 | Blankenship |
| 8,239,532 B1 * | | 8/2012 | Roskind ............ 709/225 |
| 8,471,525 B2 * | | 6/2013 | Kim et al. ............ 320/108 |
| 8,569,646 B2 | | 10/2013 | Daniel |
| 8,688,815 B2 | | 4/2014 | Chantry |
| 8,711,750 B2 * | | 4/2014 | Ling ............ G06F 1/3209 370/311 |
| 8,747,116 B2 | | 6/2014 | Zboray |
| 8,785,817 B2 | | 7/2014 | Luck |
| 8,851,896 B2 | | 10/2014 | Wallace |
| 2003/0062351 A1 | | 4/2003 | Davidson |
| 2003/0177228 A1 * | | 9/2003 | Vigouroux et al. ........ 709/224 |
| 2004/0026392 A1 | | 2/2004 | Feichtinger |
| 2004/0162630 A1 | | 8/2004 | Hillen |
| 2005/0152294 A1 | | 7/2005 | Yu |
| 2006/0187842 A1 * | | 8/2006 | French ............ 370/238 |
| 2007/0080149 A1 | | 4/2007 | Albrecht et al. |
| 2007/0080150 A1 | | 4/2007 | Albrecht et al. |
| 2007/0080151 A1 | | 4/2007 | Albrecht et al. |
| 2007/0080152 A1 | | 4/2007 | Albrecht et al. |
| 2007/0080153 A1 | | 4/2007 | Albrecht et al. |
| 2007/0251932 A1 * | | 11/2007 | Vogel et al. ............ 219/130.4 |
| 2008/0055154 A1 * | | 3/2008 | Martucci et al. ......... 342/357.1 |
| 2008/0061049 A1 | | 3/2008 | Albrecht |
| 2008/0116185 A1 | | 5/2008 | Luck et al. |
| 2008/0116186 A1 | | 5/2008 | Luck et al. |
| 2008/0149611 A1 | | 6/2008 | Roth et al. |
| 2009/0089300 A1 * | | 4/2009 | Vicente ............ 707/100 |
| 2009/0200283 A1 * | | 8/2009 | Bland et al. ............ 219/132 |
| 2009/0272221 A1 | | 11/2009 | Long et al. |
| 2009/0272222 A1 | | 11/2009 | Long et al. |
| 2010/0176106 A1 | | 7/2010 | Christensen |
| 2010/0314371 A1 * | | 12/2010 | Davidson et al. ......... 219/130.1 |
| 2011/0133995 A1 | | 6/2011 | Pascolini |
| 2011/0180517 A1 | | 7/2011 | Schneider |
| 2011/0248008 A1 | | 10/2011 | Long et al. |
| 2012/0012561 A1 | | 1/2012 | Wiryadinata |
| 2013/0092672 A1 * | | 4/2013 | Peters et al. ............ 219/130.31 |
| 2013/0112673 A1 | | 5/2013 | Petrilla |
| 2013/0116849 A1 | | 5/2013 | Kooken |
| 2015/0350821 A1 * | | 12/2015 | Dina ............ H04W 4/008 455/41.2 |

FOREIGN PATENT DOCUMENTS

| | | |
|---|---|---|
| CN | 1841437 | 10/2006 |
| CN | 101378877 | 3/2009 |
| DE | 202006009014 | 8/2006 |
| EP | 1112800 | 7/2001 |
| EP | 1681122 | 7/2006 |
| EP | 1833197 | 9/2007 |
| JP | H10143226 | 5/1998 |
| WO | 0112376 | 2/2001 |
| WO | 02085566 | 10/2002 |
| WO | 2005084867 | 9/2005 |
| WO | 2011094138 | 8/2011 |

OTHER PUBLICATIONS

International Search Report for PCT application No. PCT/US2013/055005 dated Mar. 5, 2014, 15 pgs.
International Search Report for PCT application No. PCT/US2013/055006 dated Mar. 5, 2014, 16 pgs.
International Search Report for PCT application No. PCT/US2013/055007 dated Mar. 5, 2014, 17 pgs.
International Search Report for PCT application No. PCT/US2013/055008 dated Mar. 6, 2014, 15 pgs.
Jelicic, Vana, "Power Management in Wireless Sensor Networks with High-Consuming Sensors," Qualifying Doctoral Examination, University of Zagreb, Apr. 2011, http://www.fer.unizg.hr/_download/repository/VJelicic,KDI.pdf.
Lynch, Jerome P., Kenneth J. Loh, "A Summary Review of Wireless Sensors and Sensor Networks for Structural Health Monitoring," The Shock and Vibration Digest, vol. 38, No. 2, Mar. 1, 2006, pp. 91-128.
Macii, David et al., "Power Consumpton Reduction in Wireless Sensor Networks through Optimal Syncronization," 2009 IEEE Instrumentation and Measurement Technology Conference (I2MTC), May 5-7, 2009, Singapore, IEE, Piscataway, NJ, USA, May 5, 20096, pp. 1346-1351.
"WIT Wireless Sensors: Low Cost, Reliable and Ready to Use," Monnit Corporation, Jun. 2011.
"Should You Build or Buy Wireless Sensors?," Monnit Corporation, Mar. 2011.
"Monnit Wireless Sensors and iMonnit Online Monitoring System User Guide," Monnit Corporation, Oct. 2011.

* cited by examiner

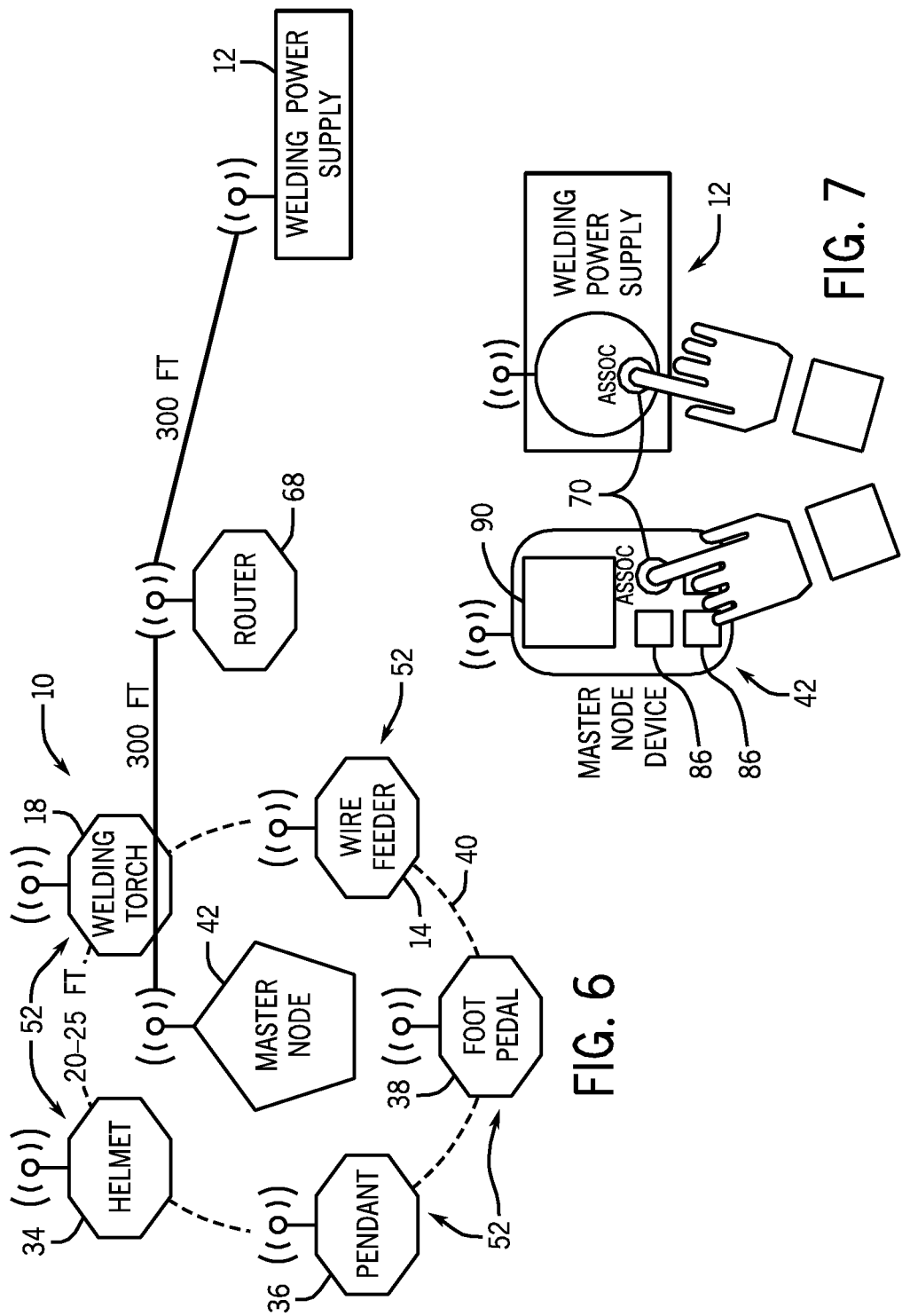

WIRELESS COMMUNICATION NETWORK POWER OPTIMIZATION FOR CONTROL OF INDUSTRIAL EQUIPMENT IN HARSH ENVIRONMENTS

CROSS REFERENCE TO RELATED APPLICATIONS

This application is a Non provisional U.S. Patent Application of U.S. Provisional Patent Application No. 61/684,546, entitled "Wireless Communication Network Power Optimization for Control of Industrial Equipment in Harsh Environments", filed Aug. 17, 2012, which is incorporated herein by reference in its entirety.

BACKGROUND

The invention relates generally to communications between industrial equipment and, more specifically, to a wireless communication network for control of industrial equipment in harsh environments.

Welding-related devices, such as the welding wire feeders, welding torches, welding helmets, welding control pendants, welding foot pedals, and so forth, are often operated at welding locations that are remote from sources of power, such as welding power supply units. For example, such remote welding locations may be up to, or even greater than, 300 feet from a source of power. As such, long cables are often extended to such remote welding locations, which can become very cumbersome. Moreover, in certain welding applications, such as ship building applications, a number of remote welding locations may be used at any given time in relatively small areas, thereby exacerbating the problem of extending cables to these remote welding locations. Furthermore, the use of wireless communication technologies in such environments has heretofore proven problematic, at least due to noise considerations (which generally hamper wireless communication), security considerations, and so forth.

BRIEF DESCRIPTION

These and other features, aspects, and advantages of the present invention will become better understood when the following detailed description is read with reference to the accompanying drawings in which like characters represent like parts throughout the drawings, wherein:

In one embodiment, a system includes a master node device. The master node device includes communication circuitry configured to facilitate communication with a welding power supply unit via a long-range communication link, and to facilitate wireless communication with one or more welding-related devices via a short-range wireless communication network. The master node device also includes control circuitry configured to manage power consumption of on-board batteries of the master node device and the one or more welding-related devices.

In another embodiment, a method includes wirelessly communicating between one or more welding-related devices and a master node device via a short-range wireless communication network. The method also includes communicating between the master node device and a welding power supply unit via a long-range communication link. The method further includes managing power consumption of on-board batteries of the master node device and the one or more welding-related devices.

In another embodiment, a wireless communication network includes one or more welding-related devices. The one or more welding-related devices include a welding wire feeder, a welding torch, a welding helmet, a welding pendant, or a welding foot pedal. The wireless communication network also includes a welding power supply unit configured to convert power from a power grid to power for a welding operation performed using the one or more welding-related devices. The wireless communication network further includes a master node device configured to facilitate wireless communication between the one or more welding-related devices and the master node device via a short-range wireless communication network, to facilitate communication between the master node device and the welding power supply unit via a long-range communication link, and to manage power consumption of on-board batteries of the master node device and the one or more welding-related devices.

DRAWINGS

These and other features, aspects, and advantages of the present invention will become better understood when the following detailed description is read with reference to the accompanying drawings in which like characters represent like parts throughout the drawings, wherein:

FIG. 1 is a diagram of an embodiment of a welding system that may utilize wireless communication networking techniques, in accordance with embodiments of the present disclosure;

FIG. 2 is a schematic diagram of an embodiment of the welding system of FIG. 1 wherein many of the welding equipment and accessories of the welding system form a local wireless network that communicates with the associated welding power supply unit, which may be located remotely from the welding equipment and accessories of the welding system, in accordance with embodiments of the present disclosure;

FIG. 6 is a schematic diagram of an exemplary local wireless network that is attached to a range extending wireless router, in accordance with the present disclosure;

FIG. 7 is a schematic diagram of a master node device and a welding power supply unit being associated with each other through simultaneous depression of respective association buttons on the master node device and the welding power supply unit (or any other accessory node), in accordance with embodiments of the present disclosure;

Figure 8:
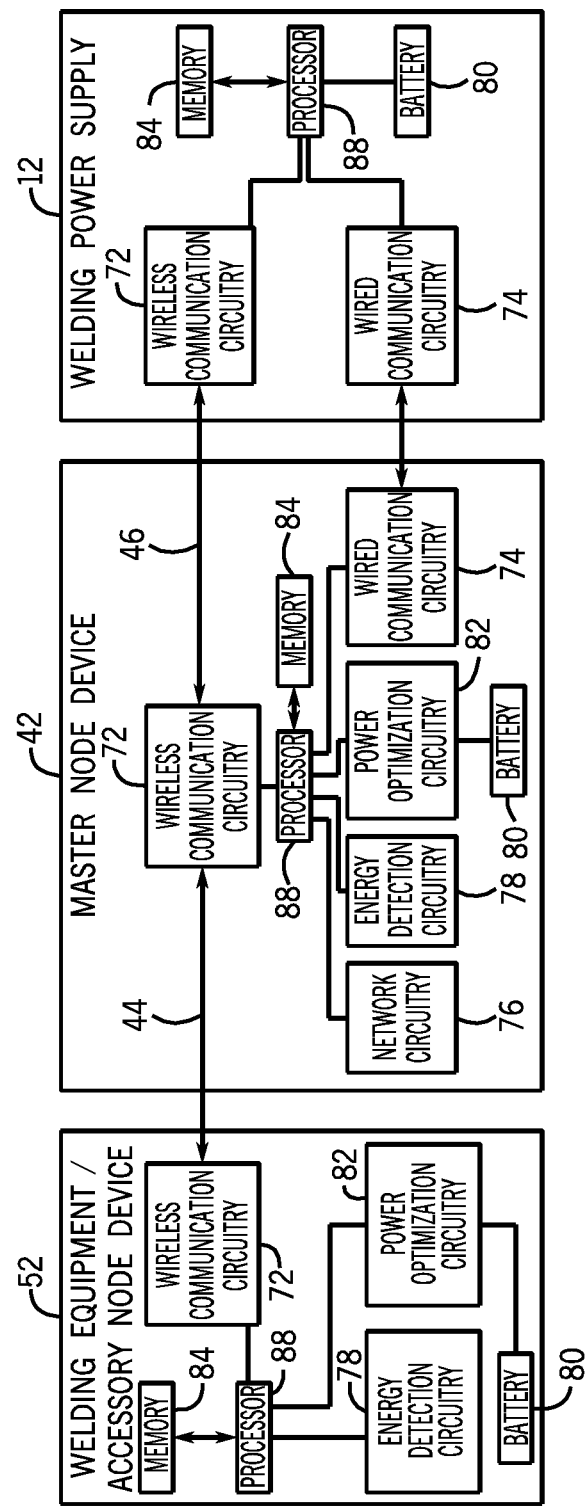
Figure 9:
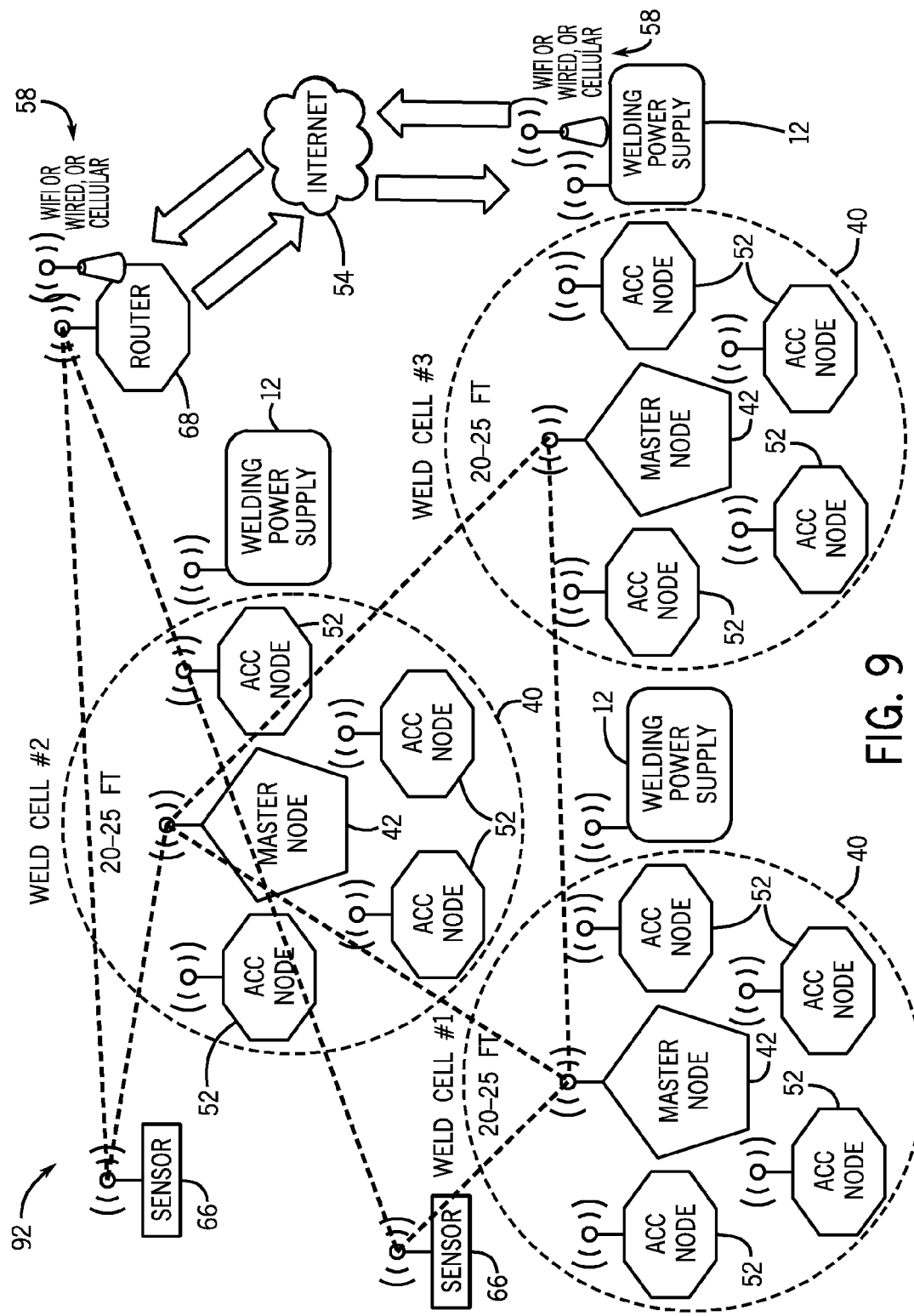

FIG. 8 is a schematic diagram of an exemplary welding power supply unit, master node device, and welding equipment/accessory node device, illustrating the internal circuitry of each device that facilitates operation of a local wireless network, in accordance with embodiments of the present disclosure; and FIG. 9 is a schematic diagram illustrating the topology of a mesh-type network of a plurality of master node devices and associated local wireless networks (e.g., weld cells) that communicate with each other and share information about each other's capabilities, thereby facilitating sensor data transmission from a plurality of sensors, in accordance with embodiments of the present disclosure.

DETAILED DESCRIPTION

Figure 1:
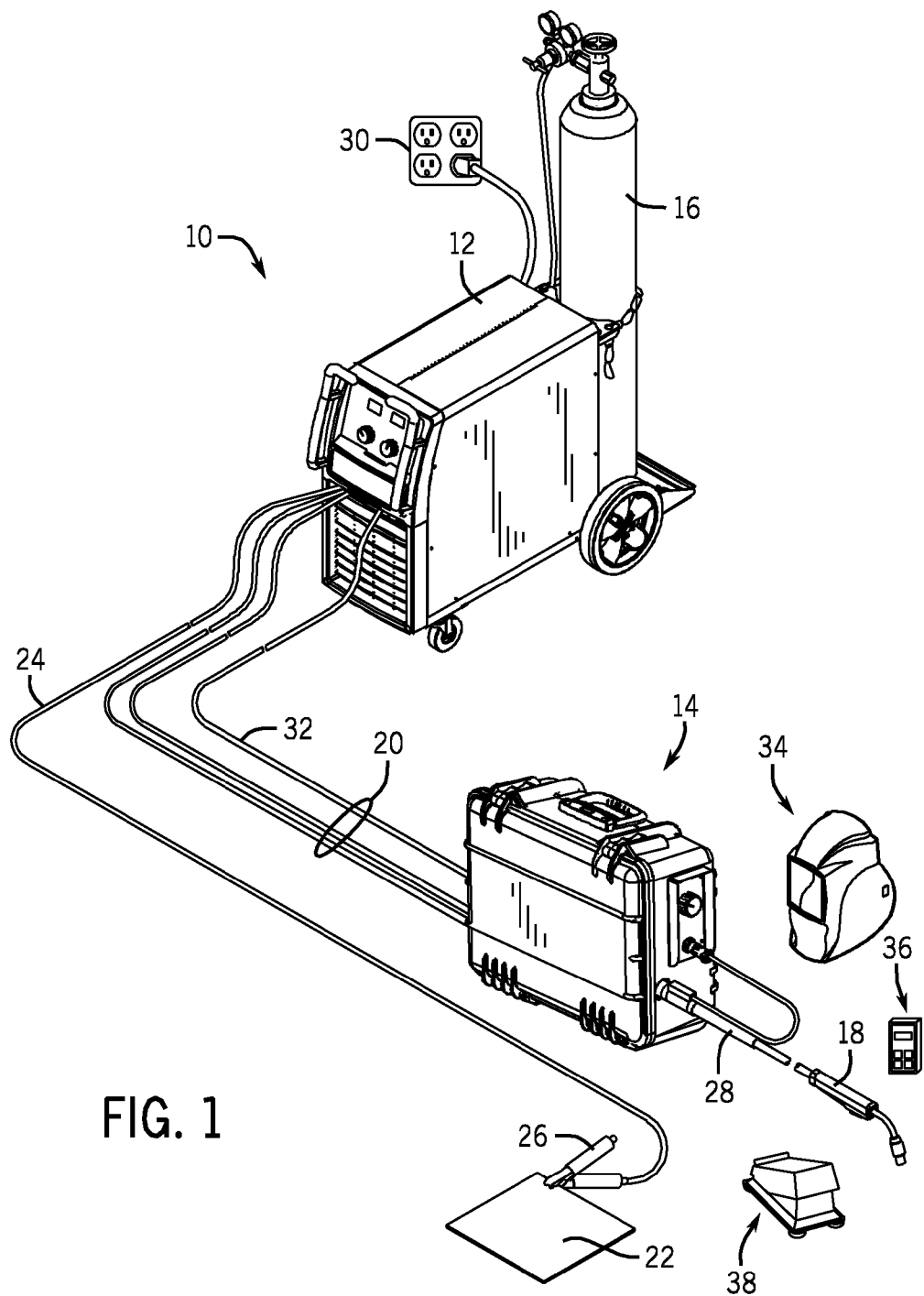

Turning to the figures, FIG. 1 is a diagram of an embodiment of a welding system 10 that may utilize wireless communication networking techniques, in accordance with embodiments of the present disclosure. It should be appreciated that, while the welding system 10 described herein is specifically presented as a gas metal arc welding (GMAW) system 10, the presently disclosed wireless communication networking techniques may also be used with other arc welding processes (e.g., FCAW, FCAW-G, GTAW, SAW, SMAW, or similar arc welding processes). More specifically, as described in greater detail below, all equipment and accessories used in the welding system 10 may be configured to wirelessly communicate with each other, as well as communicate with centralized or distributed welding control systems. The welding system 10 includes a welding power supply unit 12, a welding wire feeder 14, a gas supply system 16, and a welding torch 18. The welding power supply unit 12 generally supplies power to the welding system 10 and other various accessories, and may be coupled to the welding wire feeder 14 via a weld cable 20 as well as coupled to a workpiece 22 using a lead cable 24 having a clamp 26. In the illustrated embodiment, the welding wire feeder 14 is coupled to the welding torch 18 via a weld cable 28 in order to supply welding wire and power to the welding torch 18 during operation of the welding system 10. In another embodiment, the welding power supply unit 12 may couple and directly supply power to the welding torch 18.

In the embodiment illustrated in FIG. 1, the welding power supply unit 12 may generally include power conversion circuitry that receives input power from an alternating current power source 30 (e.g., the AC power grid, an engine/generator set, or a combination thereof), conditions the input power, and provides DC or AC output power via the weld cable 20. As such, the welding power supply unit 12 may power the welding wire feeder 14 that, in turn, powers the welding torch 18, in accordance with demands of the welding system 10. The lead cable 24 terminating in the clamp 26 couples the welding power supply unit 12 to the workpiece 22 to close the circuit between the welding power supply unit 12, the workpiece 22, and the welding torch 18. The welding power supply unit 12 may include circuit elements (e.g., transformers, rectifiers, switches, and so forth) capable of converting the AC input power to a direct current electrode positive (DCEP) output, direct current electrode negative (DCEN) output, DC variable polarity, or a variable balance (e.g., balanced or unbalanced) AC output, as dictated by the demands of the welding system 10 (e.g., based on the type of welding process performed by the welding system 10, and so forth).

The illustrated welding system 10 includes a gas supply system 16 that supplies a shielding gas or shielding gas mixtures to the welding torch 18. In the depicted embodiment, the gas supply system 16 is directly coupled to the welding torch 18 via a gas conduit 32 that is part of the weld cable 20 from the welding power supply unit 12. In another embodiment, the gas supply system 16 may instead be coupled to the welding wire feeder 14, and the welding wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In addition, in certain embodiments, other welding equipment and welding accessories (e.g., welding-related devices) may be used in the welding system 10. For example, in most welding applications, a welding helmet 34 may be worn by an operator of the welding system 10. The welding helmet 34 provides protection to the operator of the welding system 10, particularly protecting the eyes of the operator from the flashing associated with the welding arc during welding operations. In addition, in certain embodiments, the welding helmet 34 may provide feedback to the operator related to parameters of the welding operations. For example, the welding helmet 34 may include an internal display configured to display the welding parameters to the operator during the welding operations. In addition, in certain embodiments, a welding control pendant 36 may be used to communicate between the welding wire feeder 14 and the welding torch 18. The welding control pendant 36 is a device that may be used at a welding application remote from an associated welding power supply unit 12 and/or welding wire feeder 14, yet still provide substantially the same display and input devices that the remote welding power supply unit 12 and/or welding wire feeder 14 provide. In other words, the welding control pendant 36 may be used as a remote control panel when it is not feasible or practical to use control panels on an associated remote welding power supply unit 12 and/or welding wire feeder 14. In addition, in certain embodiments, a foot pedal 38 may also be used in the welding system 10. The foot pedal 38 may be used to adjust welding parameters of the welding power supply unit 12 and/or the welding wire feeder 14. For example, when an operator of the welding system 10 presses down on the foot pedal 38, a welding wire feed speed and/or welding current from the welding wire feeder 14 and/or the welding power supply unit 12 may be increased.

The welding equipment and accessories illustrated in FIG. 1 are merely exemplary and not intended to be limiting. Many other types of welding equipment and accessories may also be used in conjunction with the welding system 10. As described in greater detail below, all welding equipment and accessories used in association with the welding system 10 may be configured to wirelessly communicate with each other, as well as communicate with centralized and/or distributed welding control systems. More specifically, the wireless communication networking techniques described herein include intelligent wireless nodes and electrical interfaces to industrial equipment (e.g., in the exemplary welding equipment and accessories illustrated in FIG. 1) to be used to control and coordinate command and data communications with and between other industrial equipment wirelessly, such that the communication network enables seamless and secure exchange of welding parameters, as well as job information and other user data, between the industrial equipment. Such wireless communication networking techniques enable welding personnel or other industrial equipment personnel, with little or no experience in areas of communication theory, radio frequency technology, or information technology, to easily assemble and operate wireless communication networks that include a plurality of various equipment and accessories, such as the welding equipment and accessories illustrated in FIG. 1. The wireless communication networking techniques described herein make it easy and intuitive for the aforementioned personnel to manually assemble a wireless network at the job site, and begin using such wireless networks to perform safe and secure control of the welding equipment and accessories, as well as exchange information with other parties in the welding shop or at areas remote from the welding shop.

Figure 2:
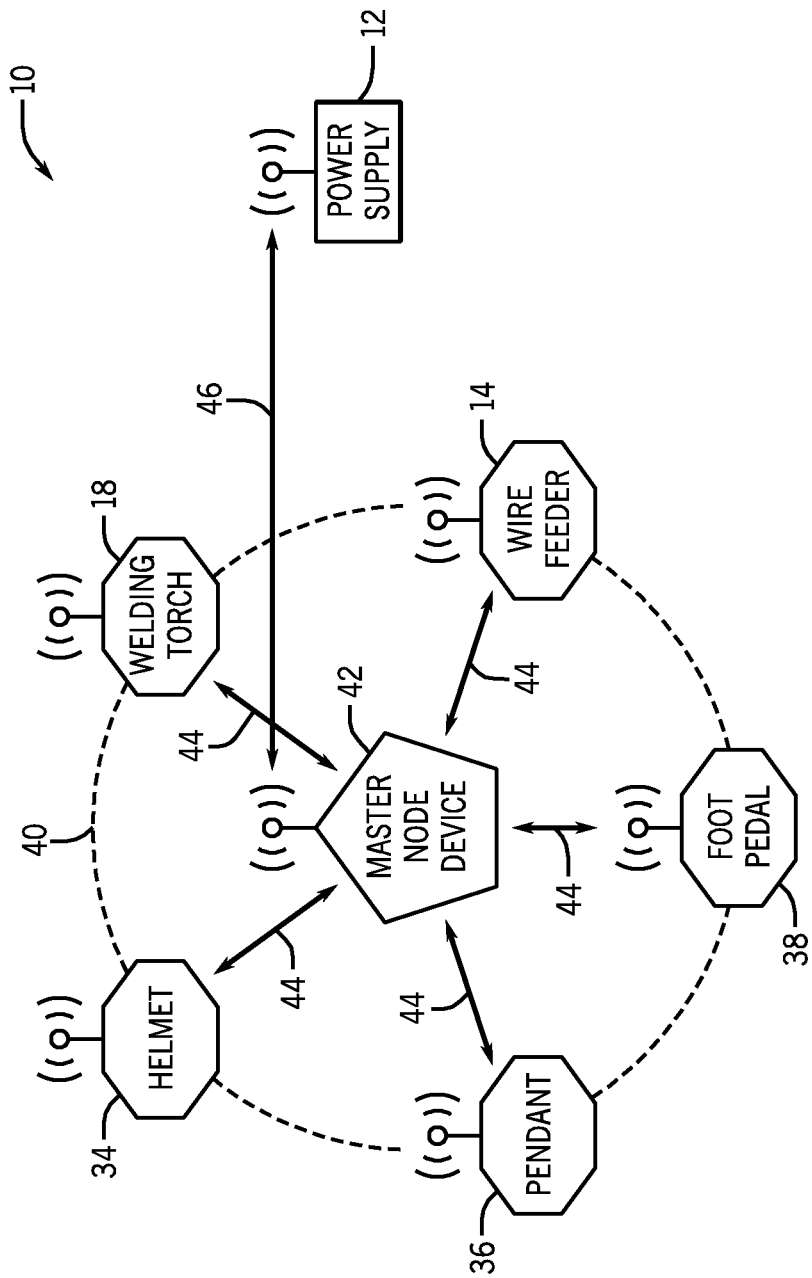

FIG. 2 is a schematic diagram of an embodiment of the welding system 10 of FIG. 1 wherein many of the welding equipment and accessories (e.g., the welding wire feeder 14, the welding torch 18, the welding helmet 34, the welding control pendant 36, the foot pedal 38, and so forth) of the welding system 10 form a local wireless network 40 that communicates with the associated welding power supply unit 12, which may be located remotely (e.g., up to or exceeding 300 feet away) from the welding equipment and accessories of the welding system 10, in accordance with embodiments of the present disclosure. More specifically, each of the welding equipment and accessories of the welding system 10 may be specifically configured to communicate wirelessly with a master node device 42 that, in turn, communicates with the respective welding power supply unit 12 of the welding system 10. As such, the local wireless network 40 is formed as a star configuration between the master node device 42 and the welding equipment and accessories of the welding system 10 (e.g., via local wireless connections 44), and the local network 40 communicates wirelessly with the respective welding power supply unit 12 through the master node device 42 (e.g., via a long-range communication connection 46), which functions as a network controller for the local wireless network 40. As described in greater detail below, in certain embodiments, the long-range communication connection 46 may be a long-range wireless communication connection (e.g., using wireless communication techniques), as illustrated in FIG. 2. However, in other embodiments, the long-range communication connection 46 may be a long-range wired communication connection (e.g., using wired communication techniques). Indeed, in certain embodiments, the master node device 42 may be configured to communicate with the welding power supply unit 12 in both (or either, depending on operating conditions) a wireless mode and a wired mode.

Figure 3:
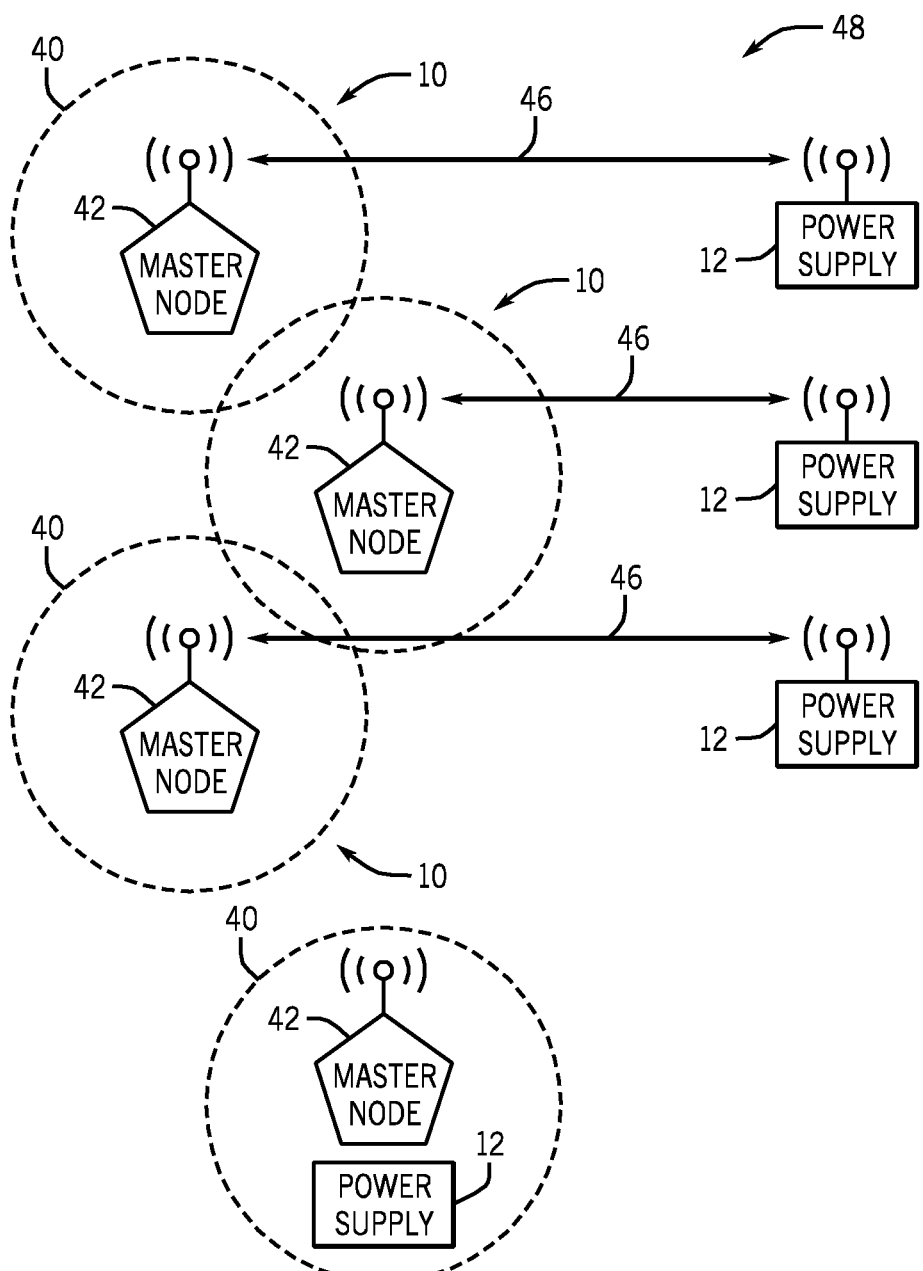
FIG. 3 is a schematic diagram of an embodiment of a welding application having a plurality of welding systems in operation at the same time, each welding system having their own local wireless networks and associated welding supply units, in accordance with embodiments of the present disclosure.

It will be appreciated that, in any particular industrial setting, more than one welding system 10 may be used in relatively close proximity of one another. For example, in a ship building application, several welding systems 10 having several associated welding power supply units 12 may be used at any given time on the ship being constructed. In such a scenario, multiple local wireless networks 40 may be established (e.g., one for each welding system 10). FIG. 3 is a schematic diagram of an embodiment of a welding application 48 having a plurality of welding systems 10 in operation at the same time, each welding system 10 having their own local wireless network 40 and associated welding power supply unit 12. As illustrated in FIG. 3, some of the welding systems 10 may have their respective welding power supply units 12 located within the local wireless coverage zone (e.g., within approximately 20-25 feet, in certain embodiments) of the respective local wireless network 40, whereas many other welding systems 10 may have their respective welding power supply units 12 located outside of the local wireless coverage zone of the respective local wireless network 40. In addition, many of the local wireless coverage zones of the local wireless networks 40 may overlap. As described in greater detail below, the wireless communication networking techniques presented herein address any issues that may arise with respect to such overlapping wireless coverage.

Figure 4:
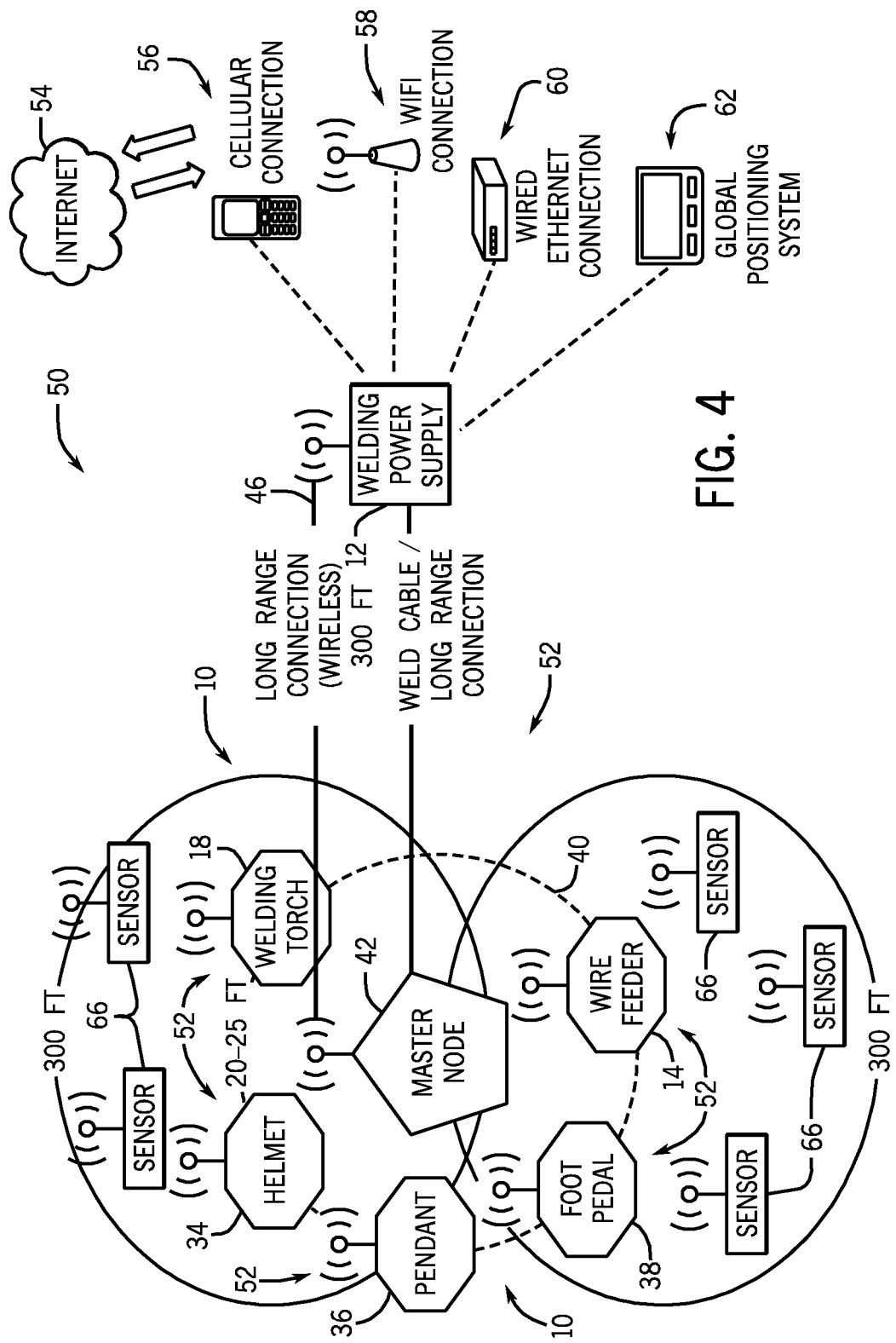
FIG. 4 is a schematic diagram of an exemplary communication system of a welding system that implements external communication device connections on a back end of the welding power supply unit, in accordance with embodiments of the present disclosure.
Figure 5:
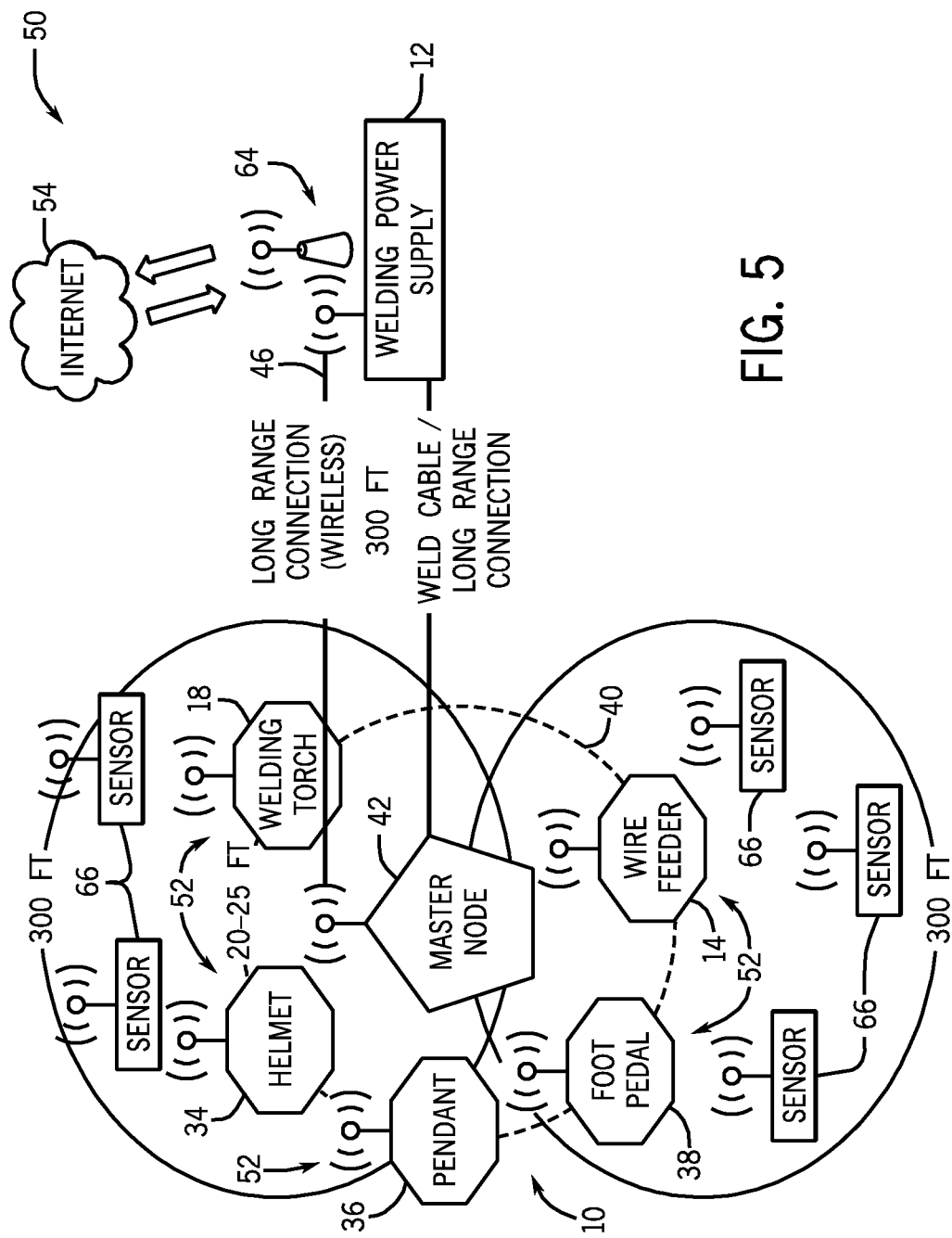
FIG. 5 is a schematic diagram of an exemplary communication system of a welding system that implements external communication device connections on a front end of the welding power supply unit, in accordance with embodiments of the present disclosure.

FIG. 4 is a schematic diagram of an exemplary communication system 50 of a welding system 10 that implements external communication device connections on a back end of the welding power supply unit 12, and FIG. 5 is a schematic diagram of an exemplary communication system 50 of a welding system 10 that implements external communication device connections on a front end of the welding power supply unit 12, in accordance with embodiments of the present disclosure. The communication system 50 described herein specifies a local wireless network 40 configured as a specific star configuration, and formed by a network controller (i.e., the master node device 42) and various welding equipment/accessory node devices 52 (e.g., the welding wire feeder 14, the welding torch 18, the welding helmet 34, the welding control pendant 36, the foot pedal 38, and so forth) located within a reasonably short distance of each other. For example, the reasonably short distance may be approximately 20-25 feet from the master node device 42 and, in certain embodiments, may be in a range of approximately 10 feet to approximately 50 feet from the master node device 42, in a range of approximately 15 feet to approximately 40 feet from the master node device 42, in a range of approximately 20 feet to approximately 30 feet from the master node device 42, or any other suitable range. The physical size (e.g., wireless transmission range) of the local wireless network 40 is not necessarily fixed, nor is it an absolute requirement for proper operation of the local wireless network 40. For example, in certain embodiments, the operating (e.g., wireless transmission) range of the local wireless network 40 may be a parameter of the master node device 42, which may be automatically adjusted by the master node device 42 to provide optimum wireless communication link quality. Although not being a fixed parameter or being an absolute requirement for operation of the local wireless network 40, the shorter the distance (e.g., wireless operating range) of the local wireless network 40, the more likely the wireless communication link integrity will remain relatively high. For example, radio frequency (RF) waves that travel shorter distances will generally maintain higher communication link integrity. Furthermore, shorter communication distances of the local wireless network 40 may even further enhance the security of the local wireless network 40, as well as ensure that other local wireless networks 40 do not potentially interfere with each other.

The communications traffic from each equipment/accessory node device 52 is sent to the master node device 42, which acts as a router and prioritization controller, and which ultimately routes the correct messages in the proper order to their final destinations, as illustrated in FIGS. 4 and 5. More specifically, in certain embodiments, the master node device 42 communicates with the welding power supply unit 12 of the welding system 10 via a radio frequency (RF) communication link as the long-range communication connection 46. As such, the master node device 42 may communicate with the welding power supply unit 12, which may be located at distances of up to, or exceeding, 300 feet from the master node device 42, without using wired communication. However, in certain embodiments, the weld cables 20, 28 (or dedicated digital link connections) may be used as backup communication channels in the event that conditions do not allow communication over the long-range communication connection 46 between the master node device 42 and the associated welding power supply unit 12.

In certain embodiments where the welding wire feeder 14 is used proximate to the local wireless network 40 and remote from the welding power supply unit 12, the master node device 42 may be attached at the end of the weld cable 20 illustrated in FIG. 1 proximate to, for example, the welding wire feeder 14. Similarly, in certain embodiments where the welding wire feeder 14 is used remotely from the local wireless network 40 (e.g., proximate to the welding power supply unit 12), the master node device 42 may be attached at the end of the weld cable 28 illustrated in FIG. 1 (or a dedicated digital communication cable) proximate to, for example, the welding torch 18. As described above, the master node device 42 is a wireless device that is associated with the local wireless network 40 and, through its physical placement proximate to the welding operations, enables a relatively long range link to the welding power supply unit 12 to be extended or made to cover areas normally blocked by physical obstructions like metal or dense concrete walls, mounds of dirt, and so forth. The long-range communication connection 46 (e.g., an RF communication link, in certain embodiments) is considered a special link with the local wireless network 40 due to the physical constraints placed on it, such as the relatively long signal travel distance, possible loss of RF line of sight, excessive reflections caused by multi-path effects, relatively low RF transmission power, and so forth.

The local wireless network 40 that is assembled by the user will be secure insofar as only equipment and accessories with the proper credentials and having synchronized "user intent" information are allowed to "associate" with the local wireless network 40. In addition, the master node device 42 is allowed to control only one welding power supply unit 12. In certain embodiments, the final destinations for control and communication data originated in the local wireless network 40 are the various welding equipment/accessory node devices 52. For example, as illustrated in FIGS. 4 and 5, the welding power supply unit 12 allows an operator working within the coverage area of the local wireless network 40 to control the welding power supply unit 12, as well as to read operating parameters (e.g., voltage and amperage settings, contactor on/off status, and so forth) from the welding power supply unit 12. In the embodiment illustrated in FIG. 4, the welding power supply unit 12 may provide access for data from the local wireless network 40 to be transferred to remote locations on the Internet 54 (e.g., to cloud storage, for example) through various hardware interfaces (e.g., a "back end" of the welding power supply unit 12) such as, but not limited to, cellular network communications 56, WiFi access 58, a wired Ethernet connection 60 (e.g., a local area network (LAN)), a global positioning system (GPS) 62, and so forth.

The local wireless network 40, through implementation of special security features described herein, connects to what is referred to as the "front end" of the welding power supply unit 12 or other industrial equipment to be controlled, by the local wireless network 40. Access to the front end allows full control over the power supply and lockout of the normal user interfaces (e.g., on the welding power supply unit 12) in order to ensure personnel safety. The control philosophy is that there may be only one human controller of the welding equipment and accessories (e.g., the welding equipment/accessory node devices 52) associated with the welding power supply unit 12 at any one time. The local wireless network 40 implements several security features to prevent unauthorized access to the local wireless network 40, and thereby to the front end of the device being controlled (e.g., the welding power supply unit 12).

Data transfer from the front end of the welding power supply unit 12 to the "back end" of the welding power supply unit 12 (through which communications to/from the welding power supply unit 12 are made), and vice versa, may be controlled through a proprietary security firewall (e.g., within the welding power supply unit 12) that is designed to satisfy all the requirements of equipment safety and authorized access of the data generated in the local wireless network 40. In situations where the welding power supply unit 12 does not implement a back end connection to external (public) networks (see, e.g., FIG. 5), a method of providing a gateway on the front end (e.g., of the welding power supply unit 12) allows access to the Internet 54 (e.g., to cloud storage, or other centralized and/or distributed control system). As such, in the event that the welding power supply unit 12 does not possess the hardware and/or software required to implement back end connectivity to the Internet 54, a special gateway device may be implemented that provides the connections. For example, this type of connectivity may be implemented in a dongle-type device 64, which may implement both the front end functionality and the back end functionality when connected to either or all of the cellular network communications 56, the WiFi access 58, the wired Ethernet connection 60, the GPS 62, and so forth. Such dongle-type device 64 may plug into an easily accessible connector on the welding power supply unit 12, allowing the dongle-type device 64 to draw the power necessary for full-time maintenance of the various communication links. Advantageously, older welding power supply units 12 already in the field may be retrofitted with such a dongle-type device 64, allowing them to provide intelligent control of the welding power supply unit 12, in addition to data access to the Internet 54. In other words, the wireless node connections from the welding power supply unit 12 may be either built into the welding power supply unit 12 or supported as a dongle-type device 64, which may be plugged into some access port connector implemented in the welding power supply unit 12.

The master node device 42 is a device that maintains a relatively long-range (e.g., up to, or even exceeding, 300 feet in length) communication connection 46 with the welding power supply unit 12 of the welding system 10 such that the data integrity of the link between the two is relatively high, while providing fail safe modes of operation. The master node device 42 also controls the local wireless network 40 formed by the various welding equipment/accessory node devices 52 that have been successfully associated with the local wireless network 40, and maintains relatively high link quality of service (LQS) with those welding equipment/accessory node devices 52. The long-range communication connection 46 between the master node device 42 and the welding power supply unit 12 may be an RF link or hardwired digital communication of a "differential signaling" mode such as, but not limited to, RS-485, RS-422, RS-644 and others.

In certain embodiments, the master node device 42 may be physically located within or adjacent to the enclosures of any of the welding equipment/accessory node devices 52 illustrated in FIGS. 4 and 5. In other words, in certain embodiments, the master node device 42 may be implemented in the welding wire feeder 14, in the welding torch 18, in the welding helmet 34, in the welding control pendant 36, in the foot pedal 38, and so forth. For example, as described above, the welding wire feeder 14 feeds welding wire of various types and sizes to the welding torch 18 to accomplish the act of welding. Wire feeders typically take their input from welding power supplies, such as the welding power supply unit 12, and produce welding wire feed speeds relative to the energy being delivered through weld cables (e.g., the weld cables 20, 28 illustrated in FIG. 1) to a welding torch (e.g., the welding torch 18). In certain embodiments, the functionality of the master node device 42 may be implemented within an enclosure (e.g., housing) of the welding wire feeder 14.

As another example, as described above, the welding helmet 34 is a device that is worn on the head of an operator of the welding system 10, and which shields the eyes of the operator from ultraviolet (UV) rays and debris generated during the welding process. The welding helmet 34 may also provide data to the operator (e.g., through the use of a display panel or other indicator lights within the welding helmet 34) relating to welding parameters currently set on the welding power supply unit 12, such as voltage, current, contact closure status, and so forth. The welding helmet 34 may also send data to the welding power supply unit 12, wherein the data is generated by the operator (e.g., through activation of buttons, keypads, and other user interface elements on the welding helmet 34). In certain embodiments, the functionality of the master node device 42 may be implemented within the welding helmet 34.

As a further example, as described above, the welding control pendant 36 is often a battery-powered, hand-held device with a graphics display or 7-segment display that provides a user interface, allowing the operator to observe the welding parameters and settings of the welding power supply unit 12 (and, in certain embodiments, the welding wire feeder 14), as well as send commands to the welding power supply unit 12 (and, in certain embodiments, the welding wire feeder 14) to operate in various modes. In certain embodiments, the welding control pendant 36 has several control buttons that allow for operator control of the welding power supply unit 12. In addition, other information from the various welding equipment/accessory node devices 52 of the local wireless network 40 may be displayed on the welding control pendant 36 and/or sent from the welding control pendant 36 to other welding equipment/accessory node devices 52 of the local wireless network 40. In certain embodiments, the functionality of the master node device 42 may be implemented within the welding control pendant 36.

As a further example, as described above, the foot pedal 38 is a device located on the floor that allows the operator of the welding system 10 to depress its top platform in order to signal to the welding power supply unit 12 (and, in certain embodiments, the welding wire feeder 14) certain adjustments to the voltage, current, contactor state, and so forth. In certain embodiments, the functionality of the master node device 42 may be implemented within the body of the foot pedal 38. In addition, in certain embodiments, the functionality of the master node device 42 may be implemented within the body of the welding torch 18.

As illustrated in FIGS. 4 and 5, the local wireless network 40 may also include a plurality of sensors 66 that, in certain embodiments, may be battery-powered RF devices that can communicate with any nearby master node device 42. The sensors 66 may send data through the master node device 42 such that the data may be uploaded to the Internet 54. In certain embodiments, the sensors 66 may not actually even be associated with operations of the particular local wireless network 40. In other words, certain sensors 66 may not be used to control the welding power supply unit 12 associated with the master node device 42 through which the sensors 66 communicate. However, the sensors 66 may nevertheless be allowed to use the local wireless network 40 and freely associate with any local wireless network 40 in order to allow for their data payload to be transported to a specific destination (e.g., cloud storage or other centralized and/or distributed control system). In other words, the master node devices 42 may be used to enable data communication of the sensors 66 regardless of whether the sensors 66 are part of the welding system 10 that is used for welding operations, and do not require any manual association means to join a local wireless network 40.

In certain situations using a long-range wireless communication connection 46, the distances between the master node device 42 and the welding power supply unit 12 being controlled may be longer than the RF waves (or other wireless signals) of the master node device 42 may travel with no (or acceptable) loss of integrity. As such, in these instances, a range extending wireless router 68 may be used to bridge the gap between the master node device 42 and the associated welding power supply unit 12. FIG. 6 is a schematic diagram of an exemplary local wireless network 40 that is attached to a range extending wireless router 68, in accordance with the present disclosure. As with the master node devices 42, an ideal range of the range extending wireless routers 68 may be approximately 300 feet, and if the distance between the master node device 42 and the associated welding power supply unit 12 is substantially greater than 300 feet, a range extending wireless router 68 may be located between the master node device 42 and the associated welding power supply unit 12.

In certain embodiments, as described in greater detail below, the associations between a master node device 42 and the various welding equipment/accessory node devices 52 of the local wireless network 40 are formed when the operator of the welding system 10 holds two devices in close proximity (e.g., within approximately two feet) and simultaneously presses "associate" buttons on each device. For example, FIG. 7 is a schematic diagram of a master node device 42 and a welding power supply unit 12 being associated with each other through simultaneous depression of respective association buttons 70 on the master node device 42 and the welding power supply unit 12 (or any other accessory node), in accordance with embodiments of the present disclosure. Although illustrated as being buttons 70, any suitable means (e.g., synchronization mechanism) for manually initiating association of the devices may be used in certain embodiments, so long as the synchronization mechanism is adequately conveys the wishes of the welding operator to join the devices into a control and command network (e.g., the local wireless network 40). The various welding equipment/accessory node devices 52 also include similar means for manually initiating association of the welding equipment/accessory node devices 52 with the master node device 42. As such, the association procedure accepts user intent in forming the local wireless network 40, which once formed will be used for the duration of a networking session to control and monitor the welding power supply unit 12 associated with the master node device 42. Once the local wireless network 40 is established, additional welding equipment/accessory node devices 52 may be added to the local wireless network 40 by repeating the association procedure between the master node device 42 and the additional welding equipment/accessory node devices 52.

The master node device 42 keeps track of and controls all aspects of communication between the welding equipment/ accessory node devices 52 associated with the local wireless network 40 of the master node device 42 until a control session has ended. Ending a control session may be accomplished in several ways. For example, the control session may be ended when the master node device 42 is removed from the local wireless network 40. As an example, if the master node device 42 has not received or transmitted a control signal to or from the local wireless network 40 for a specified period of time (e.g., approximately 5 seconds in certain embodiments), the control session of the local wireless network 40 may be ended. This condition may occur if the master node device 42 is powered off, or if the master node device 42 is prevented through any means from communicating with its associated welding equipment/accessory node devices 52. In certain embodiments, in the absence of valid "heartbeats" (i.e., communications either to or from the master node device 42), each welding equipment/accessory node device 52 will disassociate itself from the local wireless network 40, set its corresponding function to idle, and enter a standby or sleep mode. This heartbeat mechanism may intelligently return the welding power supply unit 12 to a safe condition if the communication link between the master node device 42 and the welding power supply unit 12 is interrupted. Another situation where the control session may be ended is when the welding power supply unit 12 "disappears" from the local wireless network 40 to which it was associated, such as when the interface dongle-type device 64 has been removed from the access port connector of the welding power supply unit 12, or when the welding power supply unit 12 has been removed from a power source (with the welding power supply unit 12 not having access to an alternate source of backup power). In certain embodiments, if the master node device 42 observes that the welding power supply unit 12 is not accessible for a specified period of time (e.g., approximately 5 seconds in certain embodiments), the master node device 42 may determine that the control session of the local wireless network 40 has ended, disassociate the associated welding equipment/accessory node devices 52 from the local wireless network 40, close the networking session, and put itself in a standby or sleep mode.

Once a local wireless network 40 is established, commands and messages may be sent to the welding power supply unit 12 from the master node device 42, such messages originating either in the master node device 42 or in the associated welding equipment/accessory node devices 52. Commands and messages received by the master node device 42 from the associated welding equipment/accessory node devices 52 are packetized, combined in an optimum data size and packet rate, and either buffered or sent immediately by the master node device 42 to the welding power supply unit 12. Each communication is acknowledged by the receiver, and checked for integrity using checksums, AES (advanced encryption standard) security signatures, and so forth.

Therefore, the local wireless network 40 implements wireless communication networking techniques for controlling and coordinating command and data communications between various pieces of industrial equipment (e.g., the welding equipment/accessory node devices 52). More specifically, the local wireless network 40 includes intelligent wireless nodes with electrical interfaces to industrial equipment, such as the welding equipment/accessory node devices 52 and the welding power supply unit 12. The wireless communication techniques described herein allow for reuse of the welding equipment/accessory node devices 52 by other personnel in other locations once a job is completed by disassociating the old local wireless network 40 and manually reprogramming the welding equipment/accessory node devices 52 as the welding equipment/accessory node devices 52 of the new local wireless network 40 through the simple and intuitive methods described herein.

In addition, the wireless communication networking techniques described herein provide improved network robustness. For example, the wireless communication networking techniques described herein allow multiple local wireless networks 40 to be operated within RF range of each other without harm or disruption occurring in adjacent wireless networks (e.g., other local wireless networks 40). In particular, the architecture is robust and intelligent enough to handle a multitude of wireless control and communication networks in a welding shop of industrial fabrication facility. For example, in certain embodiments, the master node device 42, upon establishing a new local wireless network 40, will scan all channels in the ISM (industrial scientific and medical band) frequency range looking for other master node devices 42 operating adjacent local wireless networks 40. If an adjacent master node device 42 is found using the same ISM channel, the scanning master node device 42 will investigate the possibility of moving its own local wireless network 40 to another channel, and will communicate that information to the other master node devices 42 that have been detected in the vicinity.

Furthermore, the wireless communication networking techniques described herein provide improved methods of dealing with interference from other wireless nodes operating in the unlicensed ISM band, such as WiFi, Bluetooth, or Zigbee radios, or general noise sources such as other welding power supply units 12 operating in the vicinity. Such welding noise has the potential of generating large RF energy spikes in frequency bands that overlap the ISM band. The master node device 42, upon establishing a new local wireless network 40, will scan all channels in the ISM band looking for noise sources. If noise sources are detected in the ISM channel currently used by the master node device 42, the master node device 42 will investigate other ISM channels to move to, and when a suitable ISM channel has been found, the master node device 42 will reprogram all of its associated welding equipment/accessory node devices 52 to the new ISM channel number. In certain embodiments, a recursive check may continuously try to find the most noise-free ISM channel available.

Moreover, the wireless communication networking techniques described herein provide improved power optimization of the welding equipment/accessory node devices 52. For example, the wireless communication networking techniques described herein allows for low power operation and programmable wake times for welding equipment/accessory node devices 52 assembled in the local wireless network 40. The timing parameters related to powering the welding equipment/accessory node devices 52 are determined based on the operator's need for bandwidth and responsiveness, balanced around a function of available battery energy. Each master node device 42 determines the requirements of the welding equipment/accessory node devices 52 associated with it, and performs power management on the welding equipment/accessory node devices 52 requesting support. Welding equipment/accessory node devices 52 that need to have their power managed by the master node device 42 may be put into sleep mode with a wake timer programmed for a time period that still allows for the minimum response time required by the network parameters for proper communication and acceptable response latency. If the latency required is 0 (or instantaneous), none of the welding equipment/ accessory node devices 52 in the local wireless network 40 will be allowed to go into sleep mode.

Once programmed with a wake time, each welding equipment/accessory node device 52 requesting power management may be put in a "deep sleep mode" for the predefined period of time. When the sleep period elapses, the welding equipment/accessory node device 52 wakes up and is available to respond to a heartbeat acknowledgement message that is sent from the master node device 42. When welding equipment/accessory node devices 52 are disassociated from the local wireless network 40, they are programmed to go into the deep sleep mode, from which they will only wake up when an operator attempts to associate them into a new local wireless network 40.

In certain embodiments, the wireless communication networking techniques described herein may additionally provide an "adaptive" method of determining when to check for noise sources on different radio channels based on history and time averages accumulated as a result of continued operation at a given job site. Using adaptive techniques enables the master node device 42 to maximize battery life of the welding equipment/accessory node devices 52 by understanding and predicting when noise mitigation countermeasures are more likely needed to be employed.

In addition, the wireless communication networking techniques described herein provide improved association and security of welding equipment/accessory node devices 52 within a given local wireless network 40. For example, the wireless communication networking techniques described herein enable workers in industrial settings, such as welders in an industrial fabrication setting, to associate different industrial equipment devices (e.g., the welding equipment/accessory node devices 52 described herein) by simply bringing them in close proximity to each other and simultaneously pressing association buttons 70 on both devices, forming a secure control and communication network (e.g., the local wireless network 40). Additional devices (e.g., the welding equipment/accessory node devices 52 described herein) may thus be added to the local wireless network 40 by associating them with the master node device 42.

Furthermore, the wireless communication networking techniques described herein provide for network sensor information to be collected and distributed as needed. For example, the wireless communication networking techniques described herein allow sensor nodes (e.g., the sensors 66) in industrial settings to associate with any nearby local wireless networks 40, allowing transport of sensor data to a local supervisor, to cloud storage, to centralized and/or distributed control systems, and so forth. The sensors 66 that have been programmed with an IP address of a final destination may request access to that location from any nearby local wireless networks 40, and such local wireless networks 40 will (through intelligent mapping of their capabilities and capabilities of other nearby networks) allow the sensor data to be forwarded on to its final destination. In certain embodiments, the sensors 66 will not destroy their local data (e.g., if infinite data retention has not been enabled) until they receive a secure acknowledgement from the final destination that the sensor data was received and is not corrupted in any way.

FIG. 8 is a schematic diagram of an exemplary welding power supply unit 12, master node device 42, and welding equipment/accessory node device 52 (e.g., the welding wire feeder 14, the welding torch 18, the welding helmet 34, the welding control pendant 36, the foot pedal 38, and so forth), illustrating the internal circuitry of each device that facilitates operation of a local wireless network 40, in accordance with embodiments of the present disclosure. For example, as illustrated in FIG. 8, the master node device 42 includes wireless communication circuitry 72 configured to facilitate wireless communication with the welding power supply unit 12 via a long-range wireless communication link (e.g., the long-range communication connection 46 illustrated in FIGS. 2-5), and to facilitate wireless communication with one or more welding-related devices (e.g., the welding equipment/accessory node devices 52) via a short-range wireless communication network (e.g., the local wireless connections 44 of the local wireless network 40). As will be appreciated, the welding power supply unit 12 also includes wireless communication circuitry 72 configured to facilitate the wireless communication with the master node device 42 via the long-range wireless communication link (e.g., the long-range communication connection 46 illustrated in FIGS. 2-5). In addition, the welding equipment/accessory node devices 52 also include wireless communication circuitry 72 configured to facilitate the wireless communication with the master node device 42 via the short-range wireless communication network (e.g., the local wireless connections 44 of the local wireless network 40).

As described above, in certain embodiments, the long-range wireless communication link (e.g., the long-range communication connection 46 illustrated in FIGS. 2-5) between the welding power supply unit 12 and the master node device 42 may be formed as an RF communication link, and the short-range wireless communication network (e.g., the local wireless connections 44 of the local wireless network 40) between the welding equipment/accessory node devices 52 and the master node device 42 may similarly utilize RF communication techniques. As such, in certain embodiments, the wireless communication circuitry 72 of the devices may include RF communication circuitry, such as RF transmitters and sensors. However, in other embodiments, any suitable means for communicating wirelessly between the welding power supply unit 12 and the master node device 42 and between the welding equipment/accessory node devices 52 and the master node device 42 may be utilized.

As described above, the wireless communication circuitry 72 of the master node device 42 and the wireless communication circuitry 72 of the welding power supply unit 12 may be configured to establish and utilize the long-range wireless communication link (e.g., the long-range communication connection 46 illustrated in FIGS. 2-5) between the welding power supply unit 12 and the master node device 42 at a transmission range of approximately 300 feet. However, in other embodiments, the transmission range of the long-range wireless communication link (e.g., the long-range communication connection 46 illustrated in FIGS. 2-5) between the welding power supply unit 12 and the master node device 42 may exceed the 300 feet previously mentioned herein.

In addition, as described above, the wireless communication circuitry 72 of the master node device 42 and the wireless communication circuitry 72 of the welding equipment/accessory node devices 52 may be configured to establish and utilize the short-range wireless communication network (e.g., the local wireless connections 44 of the local wireless network 40) between the welding equipment/accessory node devices 52 and the master node device 42 at a transmission range of approximately 20-25 feet from the master node device 42. However, in other embodiments, the transmission range of the short-range wireless communication network (e.g., the local wireless connections 44 of the local wireless network 40) between the welding equipment/ accessory node devices 52 and the master node device 42 may be in a range of approximately 10 feet to approximately 50 feet from the master node device 42, in a range of approximately 15 feet to approximately 40 feet from the master node device 42, in a range of approximately 20 feet to approximately 30 feet from the master node device 42, or any other suitable range. In general, the local wireless connections 44 of the local wireless network 40 are created by lowering the power of the wireless communication circuitry 72 such that they do not radiate too far, thereby wasting power and potentially interfering with other nearby devices.

In addition, as illustrated in FIG. 8, in certain embodiments, the master node device 42 and the welding power supply unit 12 include wired communication circuitry 74 configured to facilitate wired digital communication (e.g., welding cable communication (WCC), as well as other forms of wired digital communication) with the welding power supply unit 12 via a weld cable (e.g., the weld cables 20, 28) or other wired digital communication link either as a primary mode of communication, or when communication over the long-range wireless communication link (e.g., the long-range communication connection 46 illustrated in FIGS. 2-5) between the welding power supply unit 12 and the master node device 42 is not allowed (e.g., during temporary interruption of the long-range communication connection 46), or both.

Network Association and Security

In addition, as illustrated in FIG. 8, the master node device 42 includes network association/security circuitry 76 for facilitating association of the welding equipment/accessory node devices 52 with the master node device 42, as well as ensuring that welding equipment/accessory node devices 52, the master node device 42, and the associated welding power supply unit 12 operate securely with each other by, for example, preventing unauthorized access to the local wireless network 40 formed between the welding equipment/accessory node devices 52 and the master node device 42.

As described above, the communications traffic from each welding equipment/accessory node device 52 is sent to the master node device 42, which acts as a router and prioritization controller, and which ultimately routes the correct messages to the final destination as shown in FIGS. 4 and 5. The local wireless network 40 that is formed between the welding equipment/accessory node devices 52 and the master node device 42 will be secure insofar as only welding equipment/accessory node devices 52 having proper credentials (e.g., indicating that the device is an authorized and certified device appropriate for use with the master node device 42) and having been synchronized based on "user intent" input (e.g., via depression of synchronization mechanisms, such as the association buttons 70 described above) are allowed to "associate" with the local wireless network 40. Furthermore, the master node device 42 is only allowed to control one welding power supply unit 12, thereby further enhancing the security of the formed local wireless network 40.

As described above, in certain embodiments, the association procedure carried out by the network association/security circuitry 76 is initiated by manually pressing and holding a specially designed association button 70 of each device involved in the pairing step, such that the pairing is always performed between the master node device 42 and each device the operator wishes to add to the local wireless network 40. Once a welding equipment/accessory node device 52 has been successfully registered and associated with the master node device 42, it will remain as an active participant in the local wireless network 40 until the local wireless network 40 is dissolved. Following dissolution of the local wireless network 40, each welding equipment/accessory node device 52 and the master node device 42 are free to become associated with other local wireless networks 40.

The master node device 42 (e.g., using the network association/security circuitry 76) will determine through preliminary communication with the welding equipment/accessory node device 52 that it is the master node device 42 in the communication session, and that the other node in the communication session is a welding equipment/accessory node device 52 with the proper authorization credentials, MAC address, and security access code, among other things. This verification is necessary in order to prevent other wireless devices (e.g., Zigbee wireless devices) that are not authorized and certified, and which do not meet the safety and reliability standards, from joining the local wireless network 40 and being able to exchange data with other devices on the local wireless network 40.

Once a welding power supply unit 12 is accepted by the master node device 42, the two initial devices form the local wireless network 40. The first device to join the master node device 42 in the process of forming the local wireless network 40 is always the welding power supply unit 12, or dongle-type device 64, thus the simplest and smallest network consists of at least one controller, normally identified as the master node device 42, and an accessory node such as the welding power supply unit 12, which is considered the device expected to be controlled by the network controller (i.e., the master node device 42).

Soon after establishing the local wireless network 40, the network association/security circuitry 76 of the master node device 42 (again, commonly referred to as the network controller) will program the accessory node with a channel number, a sleep/wakeup timer value, an initial transmission power level, and other parameters needed to control transmissions within the local wireless network 40. The network association/security circuitry 76 of the master node device 42 will also inquire status information from the accessory node, such as battery level, receiver sensitivity, and other parameters which are helpful in managing the RF resources of the accessory node. It will be appreciated that these steps will also be done with the various welding equipment/accessory node devices 52 that are subsequently added to the local wireless network 40 (e.g., not just the welding power supply unit 12 or dongle-type device 64 upon initiation of the local wireless network 40).

The association method described herein is different from typical association methods (e.g., Zigbee association methods) which allow wireless nodes to connect simply by providing a unique serial number (e.g., Node ID). When implementing a control and communication network, such methods do not provide a desired level of security since virtually any device can mimic a Node ID in the correct manufacturer range and proper format, and can therefore be granted access in situations where access is not appropriate, which can result in unsafe operation, among other things.

As briefly described above with respect to FIG. 7, when the network association/security circuitry 76 of the master node device 42 notices association key presses from the user (e.g., depression of the dedication association buttons 70) on two devices, the network association/security circuitry 76 initiates the association process. The network association/security circuitry 76 remains in the association mode for as long as the buttons 70 remain pressed by the user. While in association mode, the network association/security circuitry 76 initially sets the communication channel to 15, requests a clear channel assessment on Channel 15, and lowers the transmission power of the master node device 42 (e.g., of the wireless communication circuitry 72) to the lowest level allowed by the chipset (e.g., approximately −17 dBm in certain embodiments) in order to limit the transmission range from which other welding equipment/accessory node devices 52 may hear its beacon and decide to join.

The master node device 42 then sends out a beacon on Channel 15, announcing its availability as a network coordinator for welding equipment/accessory node devices 52 within the wireless transmission range. All association takes place on Channel 15 unless energy detection circuitry 78 of the master node device 42 and/or a welding equipment/accessory node device 52 deems it a relatively noisy channel, at which point the next available channels (e.g., Channels 20, 25, and 26) are used. In certain embodiments, the master node device 42 repeats the beacon every 10 milliseconds, and waits 20 milliseconds for a response from any welding equipment/accessory node device 52 wishing to associate with the master node device 42. If no answer is received on Channel 15 for a given time period (e.g., 1000 milliseconds in certain embodiments) and algorithms of the energy detection circuitry 78 report relatively low energy (i.e., the channel is clear enough to communicate over), the network association/security circuitry 76 assumes that there are no welding equipment/accessory node devices 52 wishing to associate with the master node device 42, and terminates the association transaction. If the algorithms of the energy detection circuitry 78 detect noise on Channel 15, and the user is still pressing the association button 70 on the master node device 42, the master node device 42 will send out beacons on the next available channel (e.g., Channel 20), repeating the beaconing procedure until either of two things occurs: (1) a welding equipment/accessory node device 52 is found and the association procedure is initiated by the network association/security circuitry 76, or (2) a channel seek counter wraps around to a value of 15 after having traversed all other available channels (e.g., Channels 20, 25, and 26 in certain embodiments). As long as the user keeps pressing the association button 70 on the master node device 42, the algorithms will keep switching through channels when noise is present in order to find a clear channel that it can use to complete the association of a welding equipment/accessory node device 52 to the master node device 42.

If a welding equipment/accessory node device 52 is detected, the master node device 42 will request a MAC (media access control) address and an accessory node function code, among other things, from the welding equipment/accessory node device 52 in order to make a decision whether to map the welding equipment/accessory node device 52 into the local wireless network 40 or to reject it. The method is different from typical node association methodologies (e.g., Zigbee) that allow devices to associate if they are of the "correct" type (i.e., an End Point node can always connect to a Coordinator node). A welding equipment/accessory node device 52 requesting association with the master node device 42 must meet at least three minimum criteria. First, the welding equipment/accessory node device 52 must have a "short network address" of 0xFFFF, which means that the welding equipment/accessory node device 52 has not been persistently programmed with an address by another master node device 42 (i.e., that it belongs to another local wireless network 40). Second, the welding equipment/accessory node device 52 must possess a MAC address in the proper manufacturer's range. Third, the welding equipment/accessory node device 52 must possess the correct functionality per the sequence of association rules. For example, as described above, the first node to connect to the master node device 42 is the equipment node (e.g., the welding power supply unit 12 or other industrial equipment being controlled). In addition, duplication of welding equipment/accessory node device 52 types is limited and, in some instances, prevented. For example, some node types are allowed to have multiple instances of each type in the local wireless network 40, while some are not (e.g., there may be only one welding torch 18 per each local wireless network 40, while there may be multiple sensors 66 per each local wireless network 40). Furthermore, the association rules ensure that the minimum set of power save and data throughput are required by the type of local wireless network 40 the master node device 42 will build.

Assuming the welding equipment/accessory node device 52 passes the minimum criteria for being associated with the master node device 42, the network association/security circuitry 76 will map the welding equipment/accessory node device 52 into the local wireless network 40 and program the welding equipment/accessory node device 52 with a "short network address" representing its functionality (within the local wireless network 40) and other hierarchical network parameters, as well as sleep mode timing if the welding equipment/accessory node device 52 is a battery powered device that needs to be temporarily put to sleep during operation. Once the welding equipment/accessory node device 52 has been added to the local wireless network 40, the network association/security circuitry 76 will program the welding equipment/accessory node device 52 with a heartbeat interval, and will expect it to provide a periodic indication that it is still alive in order to maintain the safety and security features of the local wireless network 40. The heartbeat data packet from the welding equipment/accessory node device 52 may include the following data: (1) the battery level (e.g., high, medium, or low) of the welding equipment/accessory node device 52, (2) the transmission power level setting of the welding equipment/accessory node device 52, (3) the receiver sensitivity measured from the previous packet, and (4) optional custom signature of the welding equipment/accessory node device 52, among other things. It will be appreciated that, in certain embodiments, any and all subsets of this data may be provided by the welding equipment/accessory node device 52.

If a welding equipment/accessory node device 52 drops off the local wireless network 40 due to an electrical or mechanical malfunction, and such welding equipment/accessory node device 52 fails to log three consecutive heartbeat cycles with the master node device 42, the network association/security circuitry 76 will act in the following manner. If the welding equipment/accessory node device 52 is actively controlling equipment such as the welding power supply unit 12 (e.g., it is determined that the last control command for the controlled equipment came from the welding equipment/accessory node device 52), then the network association/security circuitry 76 will immediately disassociate that welding equipment/accessory node device 52 from the local wireless network 40 and send an error flag to the welding equipment/accessory node device 52 used to provide the user feedback. If the welding equipment/accessory node device 52 is "safety non-critical" such as a user display device, then the network association/security circuitry 76 will log the loss of the welding equipment/accessory node device 52 in a buffer, and will attempt to locate the welding equipment/accessory node device 52 by repeating association beacons and only allow that particular welding equipment/accessory node device 52 with that particular address to automatically re-associate provided that: (1) the local wireless network 40 that associated the welding equipment/accessory node device 52 in the first place is still running (e.g., the local wireless network 40 has not been dismantled), and (2) the short network address, node function, and manufacturer codes match the node that was detected to have been lost.

If any welding equipment/accessory node device 52 determines that it has become disconnected from the local wireless network 40 with which it was properly associated, the welding equipment/accessory node device 52 will take a series of intelligent steps to locate the master node device 42. For example, the welding equipment/accessory node device 52 may check for channel noise and switch channels away from a predefined channel (e.g., set by the master node device 42) that happens to be noisy. In addition, the welding equipment/accessory node device 52 may increase its transmission power to the maximum allowable. Furthermore, the welding equipment/accessory node device 52 may send out "distress" packets to the master node device 42 to tell it that the welding equipment/accessory node device 52 has trouble with RF transmissions, for example. In response, as described in greater detail below, the network association/security circuitry 76 of the master node device 42 may adjust the "network footprint" (e.g., increase the signal strength of the wireless communication circuitry 72 of the master node device 42) in order to mitigate the special circumstances of the "distressed node."

If these steps fail, the welding equipment/accessory node device 52 will determine that it has been orphaned from the local wireless network 40 it was associated with, and will reset itself into an un-associated type node by, for example, changing its short network address to 0xFFFF, changing its communication channel to Channel 15, changing its status to "unassociated," clearing its log and heartbeat settings, and putting itself into a low power mode or OFF mode, waiting to be awakened by an operator pressing its association button 70. The mechanism used by the welding equipment/accessory node device 52 to tell if it is still connected to the master node device 42 is to observe the details of the acknowledge ("ACK") packets sent by the master node device 42 in response to each of its heartbeat packets. Each packet, whether heartbeat or not, will have to be acknowledged within a given time period (e.g., 100 milliseconds in certain embodiments) by the master node device 42. Other data collected as a result of reading the ACK packet will help the welding equipment/accessory node device 52 determine if it is in danger of losing the wireless communication link with the master node device 42. The mechanism for accomplishing this is described in greater detail below.

If the network association/security circuitry 76 of the master node device 42 decides to disband the local wireless network 40 it has formed as a result of losing the long-range communication connection 46 to the device being controlled (e.g., the welding power supply unit 12), it will send each welding equipment/accessory node device 52 associated with the local wireless network 40 a request to disassociate, and will delete its table entries of the device information that has responded with an ACK to its request to disassociate command. Once all welding equipment/accessory node devices 52 previously associated with the master node device 42 have been successfully disassociated, the master node device 42 will enter a sleep mode or OFF mode and wait to be awakened by the user pressing its association button 70.

Improved Robustness

The wireless network architecture described herein allows for an industrial wireless network architecture that is tolerant of transmission interruptions, lost communication links, and data errors normally encountered in relatively noisy factory environments, and includes methods of working around the physical limitations of RF transmissions through protocol intelligence built into the nodes (e.g., the master node devices 42 and the welding equipment/accessory node devices 52) making up the local wireless networks 40. The techniques described herein address the inherent nature of RF transmissions being somewhat unreliable. Any particular transmission may be lost or its data corrupted and any link, no matter how solid it may have appeared at one time, could quickly become an unreliable link. The intelligence for dealing with such physical limitations and providing improved network robustness are described in greater detail below. These techniques ensure continuous improvement (e.g., updated approximately every 100 milliseconds in certain embodiments) of the reliability of the wireless communication between the master node device 42 and the welding equipment/accessory node devices 52 (as well as between the master node device 42 and the associated welding power supply unit 12 in embodiments using a long-range wireless communication connection 46).

As described above, the communication links between the nodes (e.g., the master node devices 42 and welding equipment/accessory node devices 52) making up the local wireless network 40 are established only when a human operator expresses intent to form the communication links by, for example, pressing association buttons 70 on each device to be paired. As also described above, the network configuration of each local wireless network 40 is always a "star" configuration formed with the master node device 42 acting as the master network controller between the welding equipment/accessory node devices 52 and the CID (e.g., the welding power supply unit 12). This guarantees only one master controller (i.e., the master node device 42) is responsible for setting up and managing the local wireless network 40, allowing only the welding equipment/accessory node devices 52 with appropriate credentials to join the local wireless network 40, and being aware of every source and destination of data in the local wireless network 40.

In certain embodiments, when forming a link using the association procedures described above, the wireless communication circuitry 72 of the two nodes to be connected are set into the lowest RF power mode (e.g., having a relatively short transmission range) such that their signals cannot be detected by other more distant master node devices 42, such that there will be no mistake associating the nodes that the operator intended to associate. For example, when the association buttons 70 on the nodes (e.g., the master node device 42 and a welding equipment/accessory node device 52) to be associated are pressed, the maximum transmission range of the nodes may be adjusted to be less than approximately 2 feet.

As described above, the welding equipment/accessory node devices 52 provide credentials to the network association/security circuitry 76 of the master node device 42, thereby proving they belong to the local wireless architecture described herein. For example, the welding equipment/accessory node devices 52 provide an appropriate MAC address range, network device classification, network functionality, and correct associated password, among other things. The credential requirements are different than typical ad-hoc wireless connections normally allowed through Zigbee (802.15.4), WiFi (802.11.a/b/g/n), or Bluetooth (802.15.1), which typically allow any device with the proper radio to join a network provided the device specifies (in most cases) its network functionality. The increased credential requirements described herein guarantee that only devices manufactured and certified at the highest standards are allowed to be part of the local wireless networks 40. More specifically, the increased credential requirements described herein ensure that all devices used in the local wireless networks 40 have been fully tested and certified to operate relatively error-free. As such, conventional wireless devices (e.g., conventional Zigbee devices) will not have access to the local wireless networks 40 set up by the operators.

Once associated, a set of welding equipment/accessory node devices 52 (through the respective master node device 42) can control one and only one welding power supply unit 12, removing the possibility of inadvertently controlling other welding power supply units 12 in the vicinity. The stringent association rules guarantee the safety of human operators in an industrial setting. In addition, all communication between nodes are encrypted with an AES (Advanced Encryption Standard) key published to the local wireless network 40 by each master node device 42 at the time of formation of the local wireless network 40. Thus, communications between the nodes of the local wireless network 40 cannot be hacked by a device in close RF proximity of the local wireless network 40.

Each welding equipment/accessory node device 52 in a local wireless network 40 has a hard-coded functionality classification that cannot be changed except through a hardware modification of the code identifying the welding equipment/accessory node device 52. Thus, for example, a welding wire feeder 14 will always act as a wire feeder in any local wireless network 40 with which it is associated. In addition, the network association/security circuitry 76 of each master node device 42 will only allow a certain number of nodes of each specific functionality type that would be necessary to perform a particular welding task. For example, in certain embodiments, the master node device 42 may not allow more than one welding wire feeder 14 or more than one welding torch 18 to be associated with the local wireless network 40 since there is only one operator, only one welding torch 18 may be operated by the operator at a time, and a given welding torch 18 only makes use of one welding wire feeder 14 at a time. Conversely, multiple display nodes may be allowed since multiple devices can display data related to the welding operations. However, only one such display node (e.g., a given welding pendant 36) is allowed to directly command the associated welding power supply unit 12. In certain embodiments, control responsibility may be moved from one device to another by the master node device 42 (provided that the device includes the capability to control the welding power supply unit 12), but may only reside in one particular device at any one time.

The local wireless network 40 established through the association rules described above only exists for as long as the associated welding power supply unit 12 is active. Once the welding power supply unit 12 has been turned off or the dongle-type device 64 has been removed from the 14-pin connector of the welding power supply unit 12, the local wireless network 40 is disbanded by the intelligent master node device 42. In addition, the master node devices 42 actively monitor the RF environment around themselves, and negotiate different channels with other master node devices 42 in order to allow the maximum co-existence of local wireless networks 40 in relatively noisy industrial environments. The master node devices 42 also maintain the communication links between the welding equipment/accessory node devices 52 and the welding power supply unit 12 through detailed transmission acknowledgement, monitoring of battery lives, and RF quality and issuance of periodic heartbeats, for example. All communication links in the local wireless network 40 are intelligently maintained for the duration of the life of the local wireless network 40.

If battery levels of welding equipment/accessory node devices 52 that are not line-powered are deemed too low to provide acceptable RF links, the welding equipment/accessory node devices 52 are not allowed to join the local wireless network 40. In such an event, a status warning is shown to the operator of one of the display nodes in the local wireless network 40, such as the welding helmet 34 or the welding pendant 36, requesting that the operator charge the battery of the welding equipment/accessory node device 52 with the low battery capacity. In addition, as described in greater detail below, the master node device 42 constantly monitors power levels in each of the welding equipment/accessory node devices 52 of the local wireless network 40 to ensure that the welding equipment/accessory node devices 52 will be able to wake up (if they are battery powered) at a programmed wake time, and be able to maintain their respective wireless communication link with the master node device 42.

Once associated with the local wireless network 40, each welding equipment/accessory node device 52 will provide heartbeat packets to the master node device 42 at predetermined time intervals. Missing a certain number of heartbeats in a row is usually indicative of the RF link between the particular welding equipment/accessory node device 52 and the master node device 42 having been lost, and the welding equipment/accessory node device 52 will be disassociated from the local wireless network 40.

In addition, the energy detection circuitry 78 of the master node device 42 continuously monitors channel noise on the current channel to make sure there is an expectation of acceptable "quality of service" in order for transmissions to occur within the local wireless network 40. If noise detected on the current channel is above a certain (e.g., predetermined or pre-set) threshold, the master node device 42 will find a relatively clear channel and move all of the welding equipment/accessory node devices 52 in its local wireless network 40 to the new channel. The master node device 42 also continuously monitors receiver sensitivity data provided by each welding equipment/accessory node device 52, and adjusts it transmission power (e.g., the signal strength of the wireless communication circuitry 72) accordingly in order to ensure that the master node device 42 sends data out at appropriate signal strengths to be reliably detected by all of the welding equipment/accessory node devices 52 in its local wireless network 40, but to not be "too loud" to disturb other networks nearby. In other words, the master node device 42 utilizes the receiver sensitivity data from the welding equipment/accessory node devices 52 as signal strength feedback data to appropriately adjust the signal strength of transmission from the master node device 42. In addition, the master node device 42 may cause the transmission power of the welding equipment/accessory node devices 52 to be similarly adjusted.

Loss of the long-range communication connection 46 between the master node device 42 and the welding power supply unit 12 will be detected quickly by the welding power supply unit 12, and the device will be placed in a safe mode of operation. Certain methods for mitigating the temporary loss of RF links, as well as methods to re-establish a lost link, are described in greater detail above. These methods ensure that the maximum effort is made by the master node devices 42 and the welding equipment/accessory node devices 52 in order to maintain what might otherwise be viewed as unreliable RF links.

In addition, the data transferred to and from the master node device 42 and the welding equipment/accessory node devices 52 will be packetized in optimum size packets. As described above, the star topology of the local wireless networks 40 guarantees a single intelligent controller (e.g., the master node device 42) for each local wireless network 40, along with orderly transmissions of data between the master node device 42 and the welding equipment/accessory node devices 52. This ensures that the minimum amount of wireless transmissions take place and the welding equipment/accessory node devices 52 do not spend their time arbitrating for their turn to communicate, as in conventional ad-hoc topologies. The master node device 42 receives data from all of the welding equipment/accessory node devices 52 in its local wireless network 40, and the master node device 42 packetizes and sends the data to the final destination using the optimum packet size and timing, which is determined in real time (e.g., updated approximately every 50 milliseconds in certain embodiments) from historical performance monitoring of the local wireless network 40. This helps reduce collisions of data transmissions between different welding equipment/accessory node devices 52 while improving transmission quality.

Power Management and Optimization

Some (or all) of the welding equipment/accessory node devices 52 will be powered by on-board batteries 80, as opposed to being plugged into sources of power, to facilitate the portability of the welding equipment/accessory node devices 52 among remote locations. In order to facilitate the use of on-board batteries 80 in all welding equipment/accessory node devices 52 in the local wireless network 40 (as well as the master node devices 42 and the welding power supply unit 12), the master node devices 42 (as well as the other devices) include power optimization circuitry 82 configured to use unique methods to save power among the welding equipment/accessory node devices 52 while still maintaining the necessary minimum latency and adequate levels of availability. These power optimization methods implement adaptive algorithms to determine what the optimum sleep/awake timing is for each local wireless network 40 independent of other wireless networks while still maintaining the required level of availability.

Following the pairing procedures described above, the power optimization circuitry 82 of the master node device 42 determines at least the following parameters about the local wireless network 40 it has assembled: (1) the number of welding equipment/accessory node devices 52 in the local wireless network 40, (2) the types of welding equipment/accessory node devices 52 in the local wireless network 40, (3) the timing requirements (e.g., maximum latency) of the most critical welding equipment/accessory node devices 52, (4) the transmission power footprint of the local wireless network 40 from the last set of transmissions associated with each welding equipment/accessory node device 52, and (5) the optimum channel to operate in (e.g., the least amount of measured noise from nearby devices, as described above). Using this information, as described in greater detail below, the power optimization circuitry 82 of the master node device 42 formulates a "sleep mode strategy" and schedule for all the welding equipment/accessory node devices 52 under its control to ensure that all parameters of the local wireless network 40 are met.

The power optimization circuitry 82 of the master node device 42 begins by setting the network latency of the local wireless network to that of the most stringent requirement of any of the welding equipment/accessory node devices 52 in the local wireless network 40. For example, the local wireless network 40 will be set to respond at least within 100 milliseconds if the requirements of the welding wire feeder 14 are that its feed rate must be updated no less frequently than every 100 milliseconds. The node controlling the Controlled Industrial Device (CID) (e.g., the welding power supply unit 12) has been referred to herein as, for example, the dongle-type device 64. This device node is assumed to always be powered by an AC power source, such as the power source 30 illustrated in FIG. 1, so that it is always available to send alerts to the master node device 42 or to receive commands from the master node device 42. This device node has a maximum latency requirement determined by safety requirements as well as certain loop dynamics of its control systems.

The power optimization circuitry 82 of the master node device 42 determines a "practical latency" time for each welding equipment/accessory node device 52 in the local wireless network 40 such that the welding equipment/accessory node devices 52 that are not critical to the safe operation of the equipment can spend more time in sleep mode since, for example, user updates are not as critical. In general, the welding power supply unit 12, the welding wire feeder 14, and the welding control pendant 36 are considered to be critical to the safe operation of the equipment. Each welding equipment/accessory node device 52 that can support a practical latency parameter (e.g., less stringent latency requirement) will communicate this fact to the master node device 42 upon completion of the pairing and association procedure described above. In general, the practical network latency parameters are acceptable response times that are generally greater than the overall network latency parameter of the local wireless network 40 that is set based on the most stringent requirements of the local wireless network, as described above.

The power optimization circuitry 82 of the master node device 42 programs each welding equipment/accessory node device 52 with a next wake up time minus a "network latency parameter," which is initially determined from full-time operation (e.g., during the first five minutes following formation of the local wireless network 40), and communicates to the welding equipment/accessory node devices 52 to place themselves in sleep mode as soon as their individual tasks list is empty (e.g., there are no pending requests or schedules tasks due). In certain embodiments, this network latency parameter is calculated to be twice the average transmission latency for the slowest welding equipment/accessory node device 52 in the local wireless network 40. In certain embodiments, adjustments to the network latency parameter are made if the average latency of the last three transmissions is higher than the initially calculated value, which means that over time the welding equipment/accessory node devices 52 require more time to wake up and communicate with the master node device 42 due to possible increases in noise on a certain channel, overcrowding of the RF spectrum by multiple noise sources, and so forth. In addition, the power optimization circuitry 82 of the master node device 42 places the master node device 42 into sleep mode for a duration of time that is approximately 95% of the amount of time that it programmed all of the welding equipment/accessory node devices 52 in the local wireless network 40. When the master node device 42 is placed in sleep mode, all network-specific information (e.g., routing tables, latency timing, node functionality, and so forth) are stored into non-volatile random access memory (RAM) 84 of the master node device 42 for use when the master node device 42 wakes up.

While in sleep mode, the master node device 42 monitors special operator input devices 86 on the master node device 42 (e.g., touch screens, buttons, keys, switches, and so forth, on an exterior surface of the master node device 42, as illustrated in FIG. 7) in the event that the operator needs to communicate with the CID (e.g., the welding power supply unit 12) sooner than the network latency would otherwise permit. Activating any of these operator input devices 86 produces an interruption to a processor 88 (e.g., a microprocessor, in certain embodiments) controlling the master node device 42, which wakes the master node device 42 from sleep mode, allowing the master node device 42 to start communicating with the welding equipment/accessory node devices 52 in the local wireless network 40. For example, an operator may pick up a welding control pendant 36 (functioning as the master node device 42 for the local wireless network 40) that is in sleep mode, and press a button on the welding control pendant 36, which serves as the wake event for the processor 88. The processor 88 wakes up due to the interrupt caused by the button press, interprets the button press as a specific command, sends that command to the CID (which never goes into sleep mode), and shortly thereafter acknowledges and executes the requested command. If a node other than the CID or master node device 42 (e.g., the welding equipment/accessory node devices 52) receives a user input in a similar manner, its own processor 88 (e.g., a microprocessor, in certain embodiments) will log the command in a queue in its own non-volatile random access memory (RAM) 84, and wait for the network latency timer to expire before sending the information to the master node device 42.

The embodiments described herein also allow for the CID (e.g., the welding power supply unit 12) and/or dongle-type device 64 to be powered by on-board batteries 80 (e.g., in a case of an engine drive unit when the main motor has been shut off). In this case, the CID or dongle-type device 64 will observe the standard sleep mode operation of the welding equipment/accessory node devices 52 and the master node device 42, as described above. The minimum latency value the CID or dongle-type device 64 will report to the master node device 42 will take into account all of the timing dynamics and requirements of the CID or dongle-type device 64 to make sure that it is safe for it to respond within the allocated network latency. The local wireless network 40 established according to the association procedures described above will persist through an infinite number of sleep states for as long as the local wireless network 40 is not purposely disbanded.

The battery monitoring methodology described herein allows for timely and accurate user notifications to ensure that the capacities of the on-board batteries 80 of the welding equipment/accessory node devices 52 are managed and that such information is properly displayed to the user. For example, each welding equipment/accessory node device 52 sends battery status information to the master node device 42, which will provide a display 90 (see, e.g., FIG. 7) to the user of each node's remaining battery capacity. In certain embodiments, such notification will show a graphical representation of the battery level with a 5% or better resolution of the remaining battery capacity, along with a "Remaining Usage Time" display (e.g., in hours and minutes) under current usage conditions. In addition, in certain embodiments, the master node device 42 may display the same information relating to its own battery capacity and remaining usage time. Charging information may also be transmitted to the master node device 42 from each welding equipment/accessory node device 52 and displayed on the display 90 when such node is plugged into a battery charger. For example, the charging information may show the "Charge Current" as well as an estimated time to full charge. Furthermore, in certain embodiments, the master node device 42 may provide for visual and/or audible alarms in the event that battery levels of any of the welding equipment/accessory node devices 52 fall below a given threshold (e.g., below approximately 30%) and will continue to provide periodic alarms until the particular on-board battery 80 is recharged. In addition, in certain embodiments, the master node device 42 will disassociate a welding equipment/accessory node device 52 if its on-board battery 80 runs out of power, and will report to the user the action taken through audio and/or visual cues via the display 90.

Sensor Data Transmission

As described above, sensors 66 that may not necessarily be involved with the welding operations may also utilize the local wireless networks 40 set up by factory personnel. As the local wireless networks 40 are established randomly and may only exist for a relatively short period of time, the sensors 66 may continually have to try and find a master node device 42 that it can associate with and be able to transfer its data payload to an external destination (e.g., to cloud storage or other centralized and/or distributed control system). In certain embodiments, a sensor 66 will take samples of its designated monitoring input(s) at regular intervals (e.g., approximately every 100 milliseconds), which may be programmable through the wireless links, and buffer the data in its non-volatile memory until the sensor 66 is able to connect to a local wireless network 40 and send the buffered data to its final destination. In certain embodiments, the sensors 66 may initially be programmed with a hard-coded destination IP address, which represents the target location to which the sensor 66 should send its data. The destination IP address may then be changed (e.g., through a master node device 42 or other display device of a local wireless network 40) by a requestor with appropriate credentials.

The sensors 66 may associate with available master node devices 42 as follows. An unassociated sensor 66 may wake up and listen for beacons sent out by any master node device 42 nearby that is announcing that they are the master node device 42 of a currently established local wireless network 40, and that they are ready to allow association with any nearby sensors 66 (or welding equipment/accessory node devices 52). If a master node device 42 is detected within RF range of the sensor 66, the sensor will request permission to associate with the master node device 42. At this point, the master node device 42 and the sensor 66 will exchange credentials in the same manner as the master node device and the welding equipment/accessory node devices 52 exchange credentials, as described in greater detail above. For example, the sensor 66 will convey information to the master node device relating to an appropriate MAC address range, network device classification, network functionality, and correct associated password, among other things, and the network association/security circuitry 76 of the master node device 42 will determine if the sensor 66 is compatible with the master node device 42. If the sensor 66 and the master node device 42 are determined to be compatible, a data link connection between the sensor 66 and the master node device 42 is established. This connection is not the same as the typical "command and control" associations made with the welding equipment/accessory node devices 52. Rather, the connection between the sensor 66 and the master node device 42 merely allows sensor data to move between the sensor 66 and some other destination end point. In other words, the master node device 42 functions as an intelligent router for the sensor data to/from the sensor 66.

Once a connection link is established between the sensor 66 and the master node device 42, the sensor 66 will request a "capabilities list" from the master node device 42. This capabilities list tells the sensor 66: (1) if the master node device 42 has access to the World Wide Web (WWW), (2) if the master node device 42 is aware of other master node devices 42 in the vicinity with access to the WWW, (3) the lifetime duration of the local wireless network 40 established by the master node device 42, (4) the battery status of the master node device 42 (and whether it is line-powered or battery-powered), and (5) the sleep period of the local wireless network 40 controlled by the master node device 42 (with which the sensor 66 may synchronize itself). It will be appreciated that, in certain embodiments, the "capabilities list" may include a subset of these listed items.

If the master node device 42 advertised a connection to the WWW, or if the master node device 42 to which the sensor 66 is associated with knows of other master node devices 42 in the nearby vicinity that have advertised connections to the WWW, the sensor 66 will send a ping request to the master node device 42 presenting the final destination of its data repository. The master node device 42 may have an Internet connection itself, in which case the master node device 42 acts as a bridge between the local wireless network 40 that it masters and the WWW, or it may forward requests through the back end of the CID (e.g., the welding power supply unit 12), as described above.

If the master node device 42 does not advertise a connection to the WWW, or any knowledge of how to access the WWW (e.g., through other master node devices 42), the sensor 66 will disassociate itself from the master node device 42 to which it was briefly connected for the purpose of assessing access of the master node device 42 to the WWW, and will continue its discovery routine, as described above. In certain embodiments, if a previously detected master node device 42 is again detected by the discovery routine of the sensor 66, the master node device 42 will store the hard-coded MAC address of the sensor 66 in its memory 84 as having been one that was connected briefly (e.g., for the purpose of WWW access capability assessment) and will disallow association to its local wireless network 40 unless the master node device 42 has gained access to the WWW in the time since the last association with the sensor 66 was requested. As such, time will be saved for the sensor 66 so that the sensor 66 does not unnecessarily waste battery power reassessing what was already determined (i.e., that the master node device 42 cannot provide access to the WWW).

If the master node device 42 can provide access to the WWW to the sensor 66, the master node device 42 will attempt to send a ping to the destination address provided by the sensor 66, and will wait for a response from the destination address. If the master node device 42 receives a ping response from the destination address, and the destination address is valid, the master node device 42 will inform the sensor 66 that a communication link with the destination address can be established, and that it is ready to receive data from the sensor 66. The sensor 66 will then send a count of total packets it intends to transfer to the destination address, along with the first packet of data. The master node device 42 will buffer the data, perform all the security and checksums on the data to make sure it has not been corrupted, and send the data packet to the destination address that it pinged earlier for the sensor 66.

The server at the final destination will accept the data, calculate a checksum, and send the checksum and a "current received packet" count as an ACK to the master node device 42. The master node device 42 will forward the ACK information received from the server at the final destination to the sensor 66. If satisfied with the ACK information, the sensor 66 will decrement its packet count and send the next packet to the master node device 42. The sensor 66 will permanently delete all data from its non-volatile memory buffer that has been acknowledged to have been successfully received by the server at the final destination IP address. In addition, the sensor 66 will make a log entry in a "circular buffer log" showing the time and date, size of data transferred to the final destination, as well as the time and date range of the data that was transferred. In the event that the sensor 66 has been unable to access the WWW through any nearby master node devices 42 (e.g., with the proper access capabilities) for a long time, and the sensor 66 is running out of non-volatile buffer memory, the sensor 66 will start deleting the oldest sensor data to make room for the newest sensor data collected.

The data collection methods and timing parameters, sleep/wake up and search timing parameters, and final destination IP address parameters of the sensors 66 are all reprogrammable wirelessly from a server with proper credentials and whose origination (source) IP address match the final destination IP address of the particular sensor 66. Thus, only the server being sought by the sensor 66 as its final destination, and which has received and acknowledged at least one packet of data from the sensor 66, has the right to change the IP address settings and other settings of the sensor 66 following a successful exchange of credentials. The server at the final destination with the proper credentials also has the ability to inquire about the current settings of the sensor 66 and transmit logs to be sent to it on demand. Such status information requested by the final destination server will not be deleted on the sensor 66 as standard sensor data is normally deleted following successful upload to the server.

The mesh type connection of master node devices 42 allows sensor data to find a path to a welding cell that has access to the Internet. FIG. 9 is a schematic diagram illustrating the topology of a mesh-type network 92 of a plurality of master node devices 42 and associated local wireless networks 40 (e.g., weld cells) that communicate with each other and share information about each other's capabilities, thereby facilitating sensor data transmission from a plurality of sensors 66, in accordance with embodiments of the present disclosure. While the master node devices 42 can only each control their own local wireless network 40 and associated welding power supply unit 12, the master node devices 42 can communicate with each other and allow sensor data to move from master node device 42 to master node device 42 until it reaches a device that has access to the Internet. Such a device may be a welding power supply unit 12 with a built-in gateway between the front end (industrial control side) and back end (Internet access), such as weld cell #3 illustrated in FIG. 9. A range extending wireless router 68 not associated with any of the local wireless networks 40 can also act as a gateway to the Internet if a higher level of service guarantee is desired, since the formation of local wireless networks 40 may be relatively random in a typical factory setting.

Returning now to FIG. 8, certain elements of the master node device 42 and the welding equipment/accessory node devices 52 (e.g., the network association/security circuitry 76, the energy detection circuitry 78, and the power optimization circuitry 82) are characterized as being "circuitry." It will be appreciated that, in certain embodiments, this circuitry may be embodied as hardware, a combination of hardware and software, or only software. For example, in certain embodiments where this circuitry is software, the circuitry may include computer-readable instructions that are stored in memory 84, and that are executable on the processor 88 of the particular device. However, in other embodiments, the circuitry may also include hardware elements. For example, in certain embodiments, the energy detection circuitry 78 may include certain hardware elements that assist in detecting noise levels.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    a master node device comprising:
        communication circuitry configured to facilitate communication with internal communication circuitry of a welding power supply unit via a communication link, and to facilitate wireless communication with internal wireless communication circuitry of one or more welding-related devices via a wireless communication network, wherein the communication link has a greater transmission range than the wireless communication network; and
        control circuitry configured to manage power consumption of on-board batteries of the master node device and the one or more welding-related devices by synchronizing sleep modes of the master node device and the one or more welding-related devices, wherein timing of the sleep modes of the master node device and the one or more welding-related devices is based at least in part on the types of the one or more welding-related devices associated with the master node device.

2. The system of claim 1, wherein timing of the sleep modes of the master node device and the one or more welding-related devices is further based at least in part on the number of the welding-related devices associated with the master node device, maximum latency of the most critical welding-related devices associated with the master node device, a transmission power footprint of the wireless communication network, and an optimum communication channel to operate the wireless communication network in.

3. The system of claim 1, wherein the control circuitry initially sets an overall network latency of the wireless communication network to a most stringent network latency of the one or more welding-related devices.

4. The system of claim 3, wherein the control circuitry determines and sets a practical network latency for each of the one or more welding-related devices based at least in part on a degree of criticality of the welding-related device, wherein the practical network latency for each of the one or more welding-related devices is greater than the overall network latency of the wireless communication network.

5. The system of claim 1, wherein the control circuitry is configured to collect battery status information for the on-board batteries of the master node device and the one or more welding-related devices, to display the collected battery status information on a display, and to provide visual or audible alarms if battery levels of the master node device or the one or more welding related devices fall below a threshold.

6. The system of claim 1, wherein the one or more welding-related devices comprise a welding wire feeder.

7. The system of claim 1, wherein the one or more welding-related devices comprise a welding torch.

8. The system of claim 1, wherein the one or more welding-related devices comprise a welding helmet.

9. The system of claim 1, wherein the one or more welding-related devices comprise a welding pendant.

10. The system of claim 1, wherein the one or more welding-related devices comprise a welding foot pedal.

11. The system of claim 1, wherein a welding-related device of the one or more welding-related devices comprises the master node device.

12. The system of claim 1, wherein the communication circuitry includes radio frequency (RF) transmitters and sensors.

13. A method, comprising:
    wirelessly communicating between internal wireless communication circuitry of one or more welding-related devices and wireless communication circuitry of a master node device via a wireless communication network;
    communicating between communication circuitry of the master node device and internal communication circuitry of a welding power supply unit via a communication link, wherein the communication link has a greater transmission range than the wireless communication network; and
    managing power consumption of on-board batteries of the master node device and the one or more welding-related devices by synchronizing sleep modes of the master node device and the one or more welding-related devices, wherein timing of the sleep modes of the master node device and the one or more welding-related devices is based at least in part on the types of the one or more welding-related devices associated with the master node device.

14. The method of claim 13, wherein timing of the sleep modes of the master node device and the one or more welding-related devices is further based at least in part on the number of the welding-related devices associated with the master node device, maximum latency of the most critical welding-related devices associated with the master node device, a transmission power footprint of the wireless communication network, and an optimum communication channel to operate the wireless communication network in.

15. The method of claim 13, comprising initially setting an overall network latency of the wireless communication network to a most stringent network latency of the one or more welding-related devices.

16. The method of claim 15, comprising determining and setting a practical network latency for each of the one or more welding-related devices based at least in part on a degree of criticality of the welding-related device, wherein the practical network latency for each of the one or more welding-related devices is greater than the overall network latency of the wireless communication network.

17. The method of claim 13, comprising:
    collecting battery status information for the on-board batteries of the master node device and the one or more welding-related devices;
    displaying the collected battery status information on a display; and providing visual or audible alarms if battery levels of the master node device or the one or more welding related devices fall below a threshold.

18. The method of claim 13, wherein the wireless communication network comprises a wireless communication network having a transmission range of approximately 20-25 feet from the master node device, and wherein the communication link comprises a wireless communication link having a transmission range of approximately 300 feet or more from the master node device to the welding power supply unit.

19. The method of claim 13, wherein the one or more welding-related devices comprise a welding wire feeder, a welding torch, a welding helmet, a welding pendant, or a welding foot pedal.

20. The method of claim 13, wherein a welding-related device of the one or more welding-related devices comprises the master node device.

21. A wireless communication network, comprising:
one or more welding-related devices, wherein the one or more welding-related devices comprise a welding wire feeder, a welding torch, a welding helmet, a welding pendant, or a welding foot pedal;
a welding power supply unit configured to convert power from a power grid to power for a welding operation performed using the one or more welding-related devices; and
a master node device configured to facilitate wireless communication between internal wireless communication circuitry of the one or more welding-related devices and wireless communication circuitry of the master node device via a wireless communication network, to facilitate communication between communication circuitry of the master node device and internal communication circuitry of the welding power supply unit via a communication link, and to manage power consumption of on-board batteries of the master node device and the one or more welding-related devices by synchronizing sleep modes of the master node device and the one or more welding-related devices, wherein timing of the sleep modes of the master node device and the one or more welding-related devices is based at least in part on the types of the one or more welding-related devices associated with the master node device, wherein the communication link has a greater transmission range than the wireless communication network.

* * * * *